(12) United States Patent
Yoshio

(10) Patent No.: US 7,423,410 B2
(45) Date of Patent: Sep. 9, 2008

(54) BATTERY PROTECTING CIRCUIT

(75) Inventor: Katsura Yoshio, Osaka (JP)

(73) Assignee: Texas Instruments Incorporated, Dallas, TX (US)

( * ) Notice: Subject to any disclaimer, the term of this patent is extended or adjusted under 35 U.S.C. 154(b) by 95 days.

(21) Appl. No.: 11/383,517

(22) Filed: May 16, 2006

(65) Prior Publication Data

US 2006/0255768 A1    Nov. 16, 2006

(51) Int. Cl.
*H01M 10/46* (2006.01)
(52) U.S. Cl. ........................ 320/134; 320/136
(58) Field of Classification Search ............... 320/107, 320/134, 136
See application file for complete search history.

(56) References Cited

U.S. PATENT DOCUMENTS 6,850,040 B2 * 2/2005 Xiong et al. ............... 320/134
6,888,468 B2 * 5/2005 Bertness ..................... 320/134

* cited by examiner

*Primary Examiner*—Edward H Tso
(74) *Attorney, Agent, or Firm*—William B Kempler; W. James Brady, III; Frederick J. Telecky, Jr.

(57) ABSTRACT

This invention provides a battery protecting circuit where even if the battery voltage falls nearly to zero volts due to overdischarge or the like while an NMOS transistor set in the power feeding path on the side of the positive electrode of the battery is turned ON/OFF, it is still possible to charge the battery by a constant charging current in a stable way. When the voltage of battery B1 has not reached the voltage needed for generating the driving voltage of NMOS transistors Q1, Q2 in drives 111, 112, the boosting operation of drives 111, 112 is stopped, and PMOS transistor Q3 inserted in a power feeding path different from that of said transistors is turned ON by driver 113. In driver 113, by clamping voltage VDD generated in the power feeding path of PMOS transistor Q3 to a voltage lower than it, driving voltage ZVO of PMOS transistor Q3 is generated without performing a boosting operation.

20 Claims, 11 Drawing Sheets

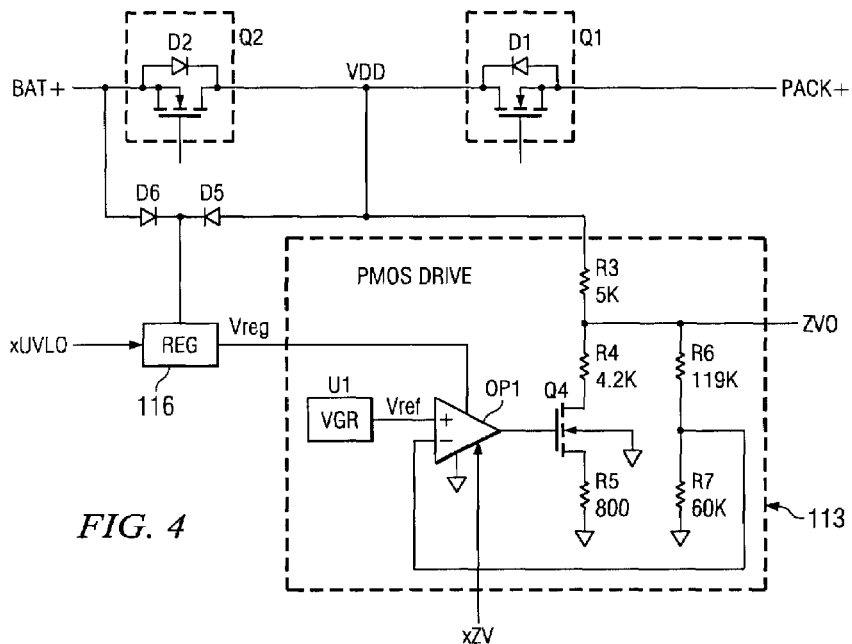
*FIG. 4*
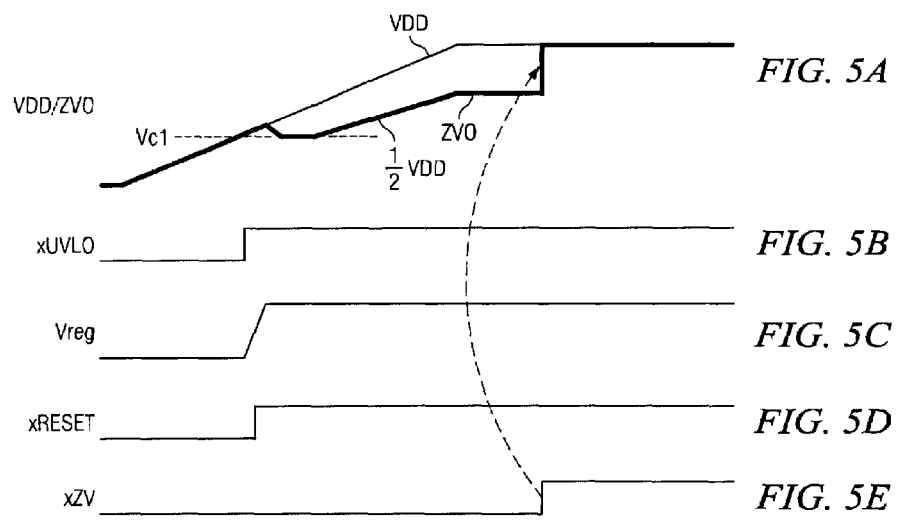
*FIG. 5A*
*FIG. 5B*
*FIG. 5C*
*FIG. 5D*
*FIG. 5E*

FIG. 9E
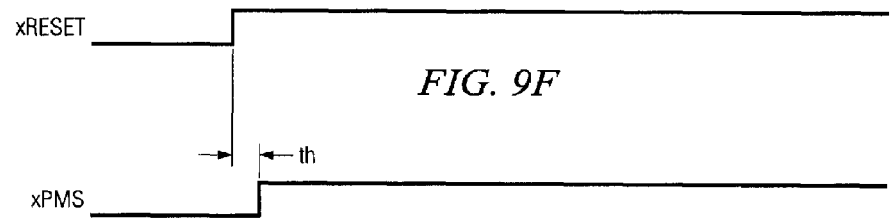
FIG. 9F
FIG. 9G
FIG. 9H
FIG. 9I
FIG. 9J

BATTERY PROTECTING CIRCUIT

FIELD OF THE INVENTION

The present invention pertains to a type of battery protecting circuit that cuts off the power feeding path to protect the battery if an abnormality takes place in charging/discharging of the battery. For example, the present invention pertains to a type of battery protecting circuit that uses an n-channel MOS transistor as the switch for cutting off the power feeding path.

BACKGROUND OF THE INVENTION

In recent years, significant progress has been realized in increasing the energy density for lithium ion batteries, nickel-hydrogen batteries and other batteries having relatively small capacities. As a result, with a small size and a light weight, the batteries can drive equipment for a long time. Improvements in the performance of batteries have significantly contributed to the popularization of portable electronic equipment, as represented by cell phones.

Also, with improvements in the performance of the battery itself, the performance of peripheral circuits has also improved. For example, notebook computers, camcorders, and other electronic equipment that allow exchange of batteries carry a type of battery device (also known as battery pack) having an electronic circuit that can realize a remaining charge management function and other functions and is incorporated in the battery main body. Recently, battery devices that can realize said functions by means of microcomputers (hereinafter to be referred to as "μC") have become popular.

On the other hand, for lithium batteries and other high-performance batteries, overcharging may lead to an abnormally high cell voltage, overdischarge may lead to too low a cell voltage, or, when an excessive charge/discharge current flows in the cell, degradation in characteristics and problems may readily take place in the structure. This is undesired. Consequently, a conventional battery device carries a circuit that can cut off the power feeding path between the battery and the electronic equipment to protect the battery when said abnormal charge/discharge takes place.

In order to cut off the power feeding path, usually, transistors or other semiconductor switching elements are used. For example, one may use a power MOSFET that has a low ON resistance and allows driving at a high current. Japanese Kokai Patent Application No. Hei 11[1999]-187578 describes a type of battery protecting circuit that cuts the power feeding path on the side of the positive electrode of the battery by means of an n-channel MOS transistor.

FIG. 10 is a diagram illustrating an example of the constitution of a battery device having a protecting circuit that cuts off the power feeding path on the side of the positive electrode of the battery by means of an n-channel MOS transistor (hereinafter to be referred to as "NMOS transistor"). As shown in FIG. 10, battery device 100 has NMOS transistors Q1, Q2, battery B1, resistor Rs1, protecting circuit 101, and microcomputer 102. For example, said battery (secondary battery) B1 is composed of plural lithium ion batteries or other battery cells connected in series. In the example shown in FIG. 10, three battery cells CEL1-CEL3 are connected in series.

NMOS transistors Q1 and Q2 have their drains connected in common. The source of NMOS transistor Q1 is connected to positive electrode PACK+ of battery device 100. The source of NMOS transistor Q2 is connected to positive electrode BAT+ of battery B1. Resistor Rs1 is connected between negative electrode BAT− of battery B1 and negative electrode PACK− of battery device 100. Said resistor Rs1 is used to detect the charge/discharge current of battery B1 in microcomputer 102 and protecting circuit 101.

Said protecting circuit 101 generates driving voltages fed to the gates of NMOS transistors Q1, Q2, and switches them ON/OFF. For example, it communicates with microcomputer 102 via a prescribed interface, and stores a set value sent from microcomputer 102 in an internal register. Then, according to the set value stored in the register, it switches ON/OFF NMOS transistors Q1, Q2.

Also, protecting circuit 101 contains a boosting circuit made of charge pump circuit or the like for generating the driving voltage of NMOS transistors Q1, Q2. The boosting circuit that generates the driving voltage of NMOS transistor Q1 boosts the voltage generated at the source (that is, positive electrode PACK+) of NMOS transistor Q1, and feeds it to the gate of NMOS transistor Q1. The boosting circuit that generates the driving voltage of NMOS transistor Q2 boosts the voltage generated at the source (that is, positive electrode BAT+) of NMOS transistor Q2 and feeds it to the gate of NMOS transistor Q2.

In addition, protecting circuit 101 contains a power source circuit for feeding power source voltage Vreg to an internal circuit and external microcomputer 102. For example, this power source circuit is composed of a linear regulator of low-dropout, and it lowers voltage VDD generated at the common drain of NMOS transistors Q1, Q2 to generate a prescribed-level power source voltage Vreg.

Also, protecting circuit 101 has several functions, such as a function with which the charging current of battery B1 is monitored based on the voltage generated across resistor Rs1, and NMOS transistors Q1, Q2 are cut off if an overcurrent is detected, and a function that detects the voltage of the battery cells CEL1-CEL3 selected corresponding to the set value of the register, and it is output to microcomputer 102.

Said microcomputer 102 monitors the charge/discharge current of battery B1 and the voltages of the various cells. If abnormality takes place, such as overcharging, overdischarge, overcurrent, etc., the set value is written in the register of protecting circuit 101 so that NMOS transistors Q1, Q2 are turned OFF. Also, it performs a treatment in which the charge/discharge current of battery B1 is integrated and the remaining charge in the battery is predicted, and a treatment in which the threshold for detection of overcurrent is set in protecting circuit 101.

Also, microcomputer 102 communicates with electronic equipment 200 to be explained later by means of an SMBUS (system management bus) or another interchip interface, and provides the information of the remaining charge of the battery of battery device 100 to electronic equipment 200.

Said battery device 100 is connected to electronic equipment 200, such as a personal computer or the like, for use. For example, as shown in FIG. 10, electronic equipment 200 has charging circuits CH1, CH2, switching circuits SW1, SW2, microcomputer 210, and load 220.

Load 220 represents the internal load of working electronic equipment 200 when power is fed from battery device 100. Charging circuits CH1, CH2 generate charging currents I1, I2 for charging battery device 100, and they are output to the power feeding path on the positive electrode PACK+ side of battery device 100. Charging circuit CH1 is connected via switching circuit SW1 to the power feeding path, and, when switching circuit SW1 is ON, charging current I1 is output to the power feeding path.

Said charging circuit CH2 is connected via switching circuit SW2 to the power feeding path, and, when switching circuit SW2 is ON, charging current I2 is output to the power feeding path. Said charging circuit CH1 is used in the normal charging operation of battery device 100. On the other hand, charging circuit CH2 is used for preparatory charging (pre-charging) when the battery voltage is below a prescribed level. Charging current I2 output from charging circuit CH2 is smaller than charging current I1 output from charging circuit CH1.

Said microcomputer 210 communicates with microcomputer 102 of battery device 100 by means of an SMBUS or the like, and it acquires the remaining charge of the battery and other information. Also, based on the information acquired from battery device 100, charging circuits CH1, CH2 and switching circuits SW1, SW2 are controlled, and the charging current of battery B1 is set at an appropriate value.

In the following, with reference to FIG. 11, an explanation will be given regarding the charging operation when the battery voltage falls nearly to zero volts due to overdischarge or the like in said battery device 100 shown in FIG. 10.

When the battery voltage falls nearly to zero volts, in order to avoid damage to the battery cells due to excessive charging current, battery B1 is charged by precharging current (I2), smaller than normal current (I1).

Step ST1:
The voltage of battery B1 is at zero volts, and switching circuit SW2 is set ON, so that precharging is started with charging current I2.

Step ST2:
In this case, because both NMOS transistors Q1, Q2 of battery device 100 are OFF, charging current Ipack fed to positive electrode PACK+ flows via body diode D1 of NMOS transistor Q1 to the drain of NMOS transistor Q1, so that voltage VDD rises (FIG. 11(A)).

Step ST3:
Due to the rise in voltage VDD, the power source circuit of protecting circuit 101 starts working, and when power source voltage Vreg is generated, said power source voltage Vreg is received, and the operation of the boosting circuit of protecting circuit 101 starts. Also, by means of said power source voltage Vreg, protecting circuit 101 is started (FIG. 11(D)).

Step ST4:
Due to the driving voltage generated by the boosting circuit, NMOS transistor Q2 is turned ON, and charging current Ipack (=I2) flows to batteries CEL1-CEL3 (FIG. 11(C)).

Step ST5:
When the voltage of the driving voltage of the boosting circuit rises, the ON resistances of NMOS transistors Q1, Q2 decrease, so that voltage VDD falls.

Step ST6:
When the voltage of voltage VDD falls below the voltage at which the power source circuit can work, feeding of power source voltage Vreg from the power source circuit is stopped, and the operation of the boosting circuit is stopped. As a result, NMOS transistor Q2 is turned OFF, and the charging current of battery B1 becomes zero (FIG. 11(C)). Also, because the feeding of power source voltage Vreg is stopped, protecting circuit 101 is shut down (FIG. 11(D)).

Step ST7:
When NMOS transistor Q2 is turned OFF, voltage VDD rises again due to charging current Ipack that flows via body diode D1. Until the voltage of battery B1 reaches a voltage that allows working of the power source circuit, the operation of said steps ST2-ST6 is repeated, and the battery is charged intermittently.

Step ST8:
When the voltage of battery B1 reaches a prescribed level at which the power source circuit can work, even if NMOS transistor Q2 is ON, the power source circuit is still not stopped. As a result, the boosting circuit keeps working, and NMOS transistor Q2 is kept ON as is. Consequently, the battery is charged by a constant charging current Ipack (=I2).

Step ST9:
The voltage of battery B1 further rises, and when it reaches the level at which charging can be performed with the normal charging current, switching circuit SW2 is turned OFF and switching circuit SW1 is turned ON, and charging current I1 is fed to the battery (FIG. 11(C)). Also, both NMOS transistors Q1, Q2 are turned ON. As a result, charging is performed at a rate higher than that in the precharging mode.

Step ST10:
When the voltage of battery B1 reaches the upper limit value (Vc) of the output voltage of charging circuit CH1, charging current I1 becomes zero, and charging of battery B1 comes to an end.

In this way, in battery device 100 shown in FIG. 10, when the battery voltage falls nearly to zero volts due to overdischarge or the like, the boosting circuit of battery device 100 cannot stably operate, and NMOS transistor Q2 is turned ON/OFF alternately. Consequently, the charging current flowing to the battery becomes intermittent, and this is undesired. Especially when NMOS transistor Q2 changes from OFF to ON, the current flowing to the battery may temporarily become higher than precharging current I2, and this may lead to degradation of the battery cells.

A general object of the present invention is to solve the aforementioned problems of the prior art by providing a type of battery protecting circuit characterized by the fact that by means of a driving voltage generated by boosting the voltage generated in the power feeding path between the external power source and the battery, the NMOS transistor or other switching circuit set in the power feeding path is switched ON/OFF, and even when the battery voltage falls nearly to zero volts due to overdischarge or the like, the battery can still be charged steadily with a constant charging current.

SUMMARY OF THE INVENTION

This and other objects and features are provided, in accordance with one aspect of the present invention by a type of battery protecting circuit characterized by the fact that the battery protecting circuit controls ON/OFF of a first switching circuit inserted in a first power feeding path between an external power source and the battery, and it has the following circuits: a first switch driver that generates a first driving voltage by boosting the voltage generated in said first power feeding path corresponding to an input control signal, and turns ON said first switching circuit with said first driving voltage, a second switch driver that generates a second driving voltage lower than the voltage generated in a second power feeding path between said external power source and said battery corresponding to the input control signal, and turns ON a second switching circuit inserted in said second power feeding path with the second driving voltage, and a controller that outputs said control signal such that when the voltage of said battery reaches the voltage needed for the boosting operation of said first switch driver, said first switch driver stops the boosting operation, and said second switch driver generates said second driving voltage.

This aspect may include said second switch driver generating said second driving voltage lower than the voltage generated in said second power feeding path between said external power source and said second switching circuit. In this case, the following scheme may be adopted: a first resistor is inserted in said second power feeding path between said second switching circuit and said battery.

Also, this aspect may include a second resistor inserted in said second power feeding path between said external power source and said second switching circuit, and said second switch driver generates said second driving voltage lower than the voltage generated in said second power feeding path between said second resistor and said second switching circuit.

The battery protecting circuit as the first aspect of the present invention, may include having a power source circuit that generates the power source voltage of said controller based on the voltage fed to said external power source through said first power feeding path, and a reset circuit that outputs a reset signal when the power source voltage generated in said power source circuit is lower than a prescribed voltage; said controller performs the following operation: when said reset signal is received and it starts, it outputs said control signal such that said first switch driver stops the boosting operation, and said second switch driver generates said second driving voltage, and, when a prescribed signal is input to indicate that the voltage of said battery has reached the voltage needed for performing the boosting operation of said first switch driver, it outputs said control signal such that said first switch driver starts the boosting operation, and said second switch driver stops generating said second driving voltage.

A second aspect of the present invention provides a type of battery protecting circuit characterized by the fact that the battery protecting circuit controls ON/OFF of a switching circuit inserted in the power feeding path between the external power source and the battery. It has the following circuits: a switch driver that generates a voltage by boosting the voltage generated in said power feeding path corresponding to the input control signal, and turns ON said switching circuit with said boosted voltage, a driving voltage feeding circuit that feeds the voltage for turning ON said switching circuit from said external power source through said power feeding path to said switching circuit corresponding to the input control signal, and a controller that outputs said control signal such that when the voltage of said battery has not reached the voltage needed for the boosting operation of said switch driver, said switch driver stops the boosting operation and said driving voltage feeding circuit feeds a driving voltage to said switching circuit.

This aspect may include said switching circuit having a first NMOS transistor inserted in said power feeding path such that the diode contained between the drain and the source becomes forward-biased with respect to the charging current flowing from said external power source to said battery, and a second NMOS transistor inserted in said power feeding path such that the diode contained between the drain and the source becomes backward-biased with respect to said charging current. Said switch driver boosts the voltage generated at the source of said first NMOS transistor and feeds it to the gate of said first NMOS transistor while it boosts the voltage generated at the source of said second NMOS transistor and feeds it to the gate of said second NMOS transistor. Said driving voltage feeding circuit has a second PMOS transistor connected between the drain and gate of said second PMOS transistor, and a transistor driver that drives said second PMOS transistor ON/OFF corresponding to the control signal of said controller.

The battery protecting circuit of said second aspect of the present invention may include having a diode connected in series to said second PMOS transistor such that the current flowing to said second PMOS transistor is stopped by said boosted voltage of said switch driver.

Also, the battery protecting circuit as the second aspect of the present invention, may include having it has a first terminal for input of the voltage for selecting the charging mode of said battery, a judgment circuit that judges whether a voltage is fed from said external power source through said power feeding path to said first terminal, a power source circuit that generates the power source voltage of said controller based on the voltage fed from said external power source through said power feeding path, and a reset circuit that outputs a reset signal when the power source voltage generated in said power source circuit is lower than a prescribed voltage. When a voltage is fed from said external power source through said power feeding path to said first terminal, said transistor driver drives ON said second PMOS transistor if said reset circuit outputs said reset signal or said controller outputs said control signal for turning ON said second PMOS transistor. Said controller performs the following operation: when said reset signal is received and it starts, it outputs said control signal such that said first switch driver stops the boosting operation; when said reset circuit stops output of said reset signal, if said judgment circuit judges that the voltage from said external power source is fed to said first terminal, it outputs said control signal such that said transistor driver turns ON said second PMOS transistor; when a signal is input indicating that the voltage of said battery has reached the voltage needed for the boosting operation of said switch driver, it outputs said control signal such that said switch driver starts the boosting operation, and said transistor driver turns OFF said second PMOS transistor.

A third aspect of the present invention provides a type of battery protecting circuit characterized by the following facts: the battery protecting circuit is for driving the first and second transistors of the battery device that has a secondary battery and a first and a second transistor connected in series between the power source terminal of the secondary battery and the external power source terminal; the battery protecting circuit has a first driver that feeds the first driving signal to the control terminal of said first transistor, a second driver that feeds the second driving signal to the control terminal of said second transistor, and a mode selector that contains a mode selection terminal that applies a voltage corresponding to the voltage fed to the external power source terminal or a reference voltage, a fourth transistor that can be connected between the connection middle point between said first transistor and said second transistor and the control terminal of said second transistor, and a driver for feeding the fourth driving signal to the control terminal of said fourth transistor corresponding to the voltage applied on said mode selection terminal; and, when current is fed from the external power source terminal to the secondary battery, if the voltage appearing at said mode selection terminal is a voltage corresponding to the voltage fed to said external power source terminal, said fourth transistor is turned ON.

The battery protecting circuit as the third aspect of the present invention, may include having a voltage monitoring circuit that monitors the voltage fed to the external power source terminal, and a power source circuit that can feed power from the connection middle point between said first transistor and said second transistor, and said power source circuit starts the internal power source voltage after said voltage monitoring circuit detects the prescribed voltage.

Said first and second transistors may be first and second NMOS transistors having their drains connected to each other.

A fourth aspect of the present invention, a type of battery protecting circuit is provided characterized by the following facts: the battery protecting circuit is for driving the first, second and third transistors of the battery device that has a secondary battery, a first and a second transistor connected in series between the power source terminal of the secondary battery and the external power source terminal and a third transistor connected between the connection middle point between said first transistor and said second transistor and the power source terminal of the secondary battery; the battery protecting circuit has a first driver that feeds the first driving signal to the control terminal of said first transistor, a second driver that feeds the second driving signal to the control terminal of said second transistor, a third driver that feeds the third driving signal to the control terminal of said third transistor, a mode selector that contains a mode selection terminal that applies a voltage corresponding to the voltage fed to the external power source terminal or a reference voltage, a fourth transistor that can be connected between the connection middle point between said first transistor and said second transistor and the control terminal of said second transistor, and a driver for feeding the fourth driving signal to the control terminal of said fourth transistor corresponding to the voltage applied on said mode selection terminal, a voltage monitoring circuit for monitoring the voltage fed to the external power source terminal, and a power source circuit, with power fed from the connection middle point between said first transistor and said second transistor, which starts feeding of the internal power source voltage after said voltage monitoring circuit detects a prescribed voltage; and, when current is fed from the external power source terminal to the secondary battery, if the voltage appearing at said mode selection terminal corresponds to the reference voltage, said fourth transistor is turned OFF, and, when an internal power source voltage is not fed from said power source circuit, said third driver responds to the voltage appearing at the connection middle point between said first transistor and said second transistor and feeds the third driving signal to turn ON said third transistor.

The battery protecting circuit, may include: said battery device having a first resistance element connected between the power source terminal of the secondary battery and said third transistor. Also, said battery device has a second resistance element connected between the connection middle point between said first transistor and said second transistor and said third transistor. Also, said first and second transistors may be first and second NMOS transistors with their drains connected to each other, said third transistor may be a PMOS transistor having its source connected to the drains of said first and second NMOS transistors.

BRIEF DESCRIPTION OF THE DRAWINGS

FIG. 4 is a diagram illustrating a constitution example of the driver of a PMOS transistor inserted in the power feeding path.

FIGS. 5A-E are diagrams illustrating an example of the operation of the driver shown in FIG. 4.

REFERENCE NUMERALS AND SYMBOLS AS SHOWN IN THE DRAWINGS

In the figures, 100A-100C represent a battery device, 200 and 200B electronic equipment, CH1 and CH2 charging circuits, 110 a protecting circuit, 150 and 210 microcomputers, B1$a$ battery, Q1, Q2, Q4 and Q6-Q9 an NMOS transistor, Q3 and Q5 a PMOS transistor, Rs1 and R1-R12 a resistor, C1$a$ capacitor, D1-D6 a diode, ZD1 a zener diode, OP1 a differential amplifier, U1 a reference voltage generator, U2 a buffer circuit, 111-113 a driver, 114 a mode selector, 115 a low-voltage operation lock circuit, 116 a power source circuit, 117 a reset circuit, 118 a cell voltage detector, 119 an overcurrent detector, and 120 a controller.

Description of the Embodiments

According to the present invention, when the battery voltage has not reached the voltage needed for the boosting operation for generating the driving voltage of the switching circuit, by turning ON a switching circuit that is inserted in another power feeding path and does not require the boosting operation, it is possible to charge the battery steadily with a constant charging current.

Also, according to the present invention, when the battery voltage has not reached the voltage needed for the boosting operation to generate the driving voltage of the switching circuit, by turning ON the switching circuit with a voltage sent from the external power source via the power feeding path, it is possible to charge the battery steadily with a constant charging current.

Optimum Embodiment of the Invention

In the following, an explanation will be given with reference to figures regarding the battery protecting circuit of the present invention adopted in a battery device.

Figure 1:
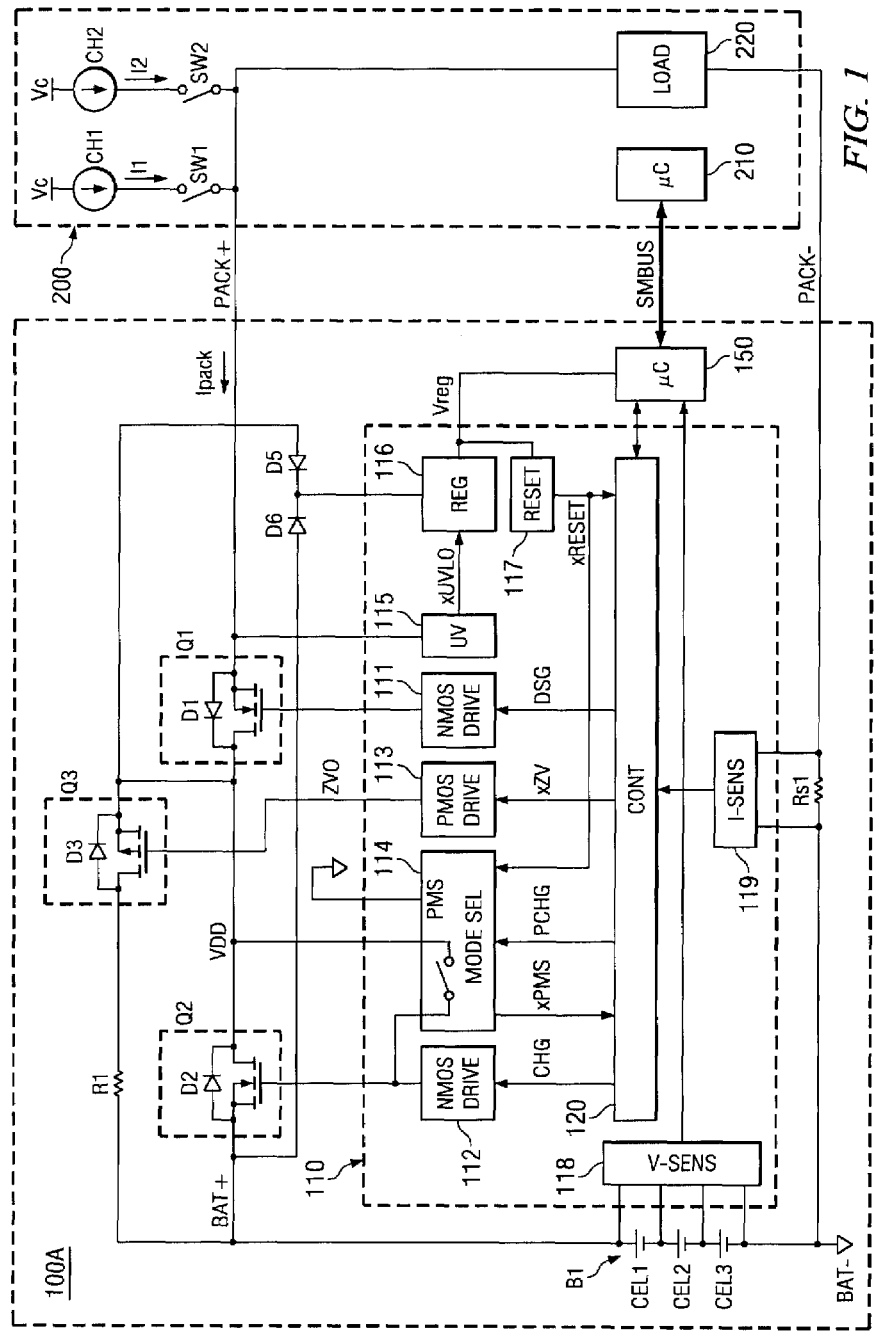
FIG. 1 is a diagram illustrating a first constitution example of the battery device in an embodiment of the present invention.
Figure 2:
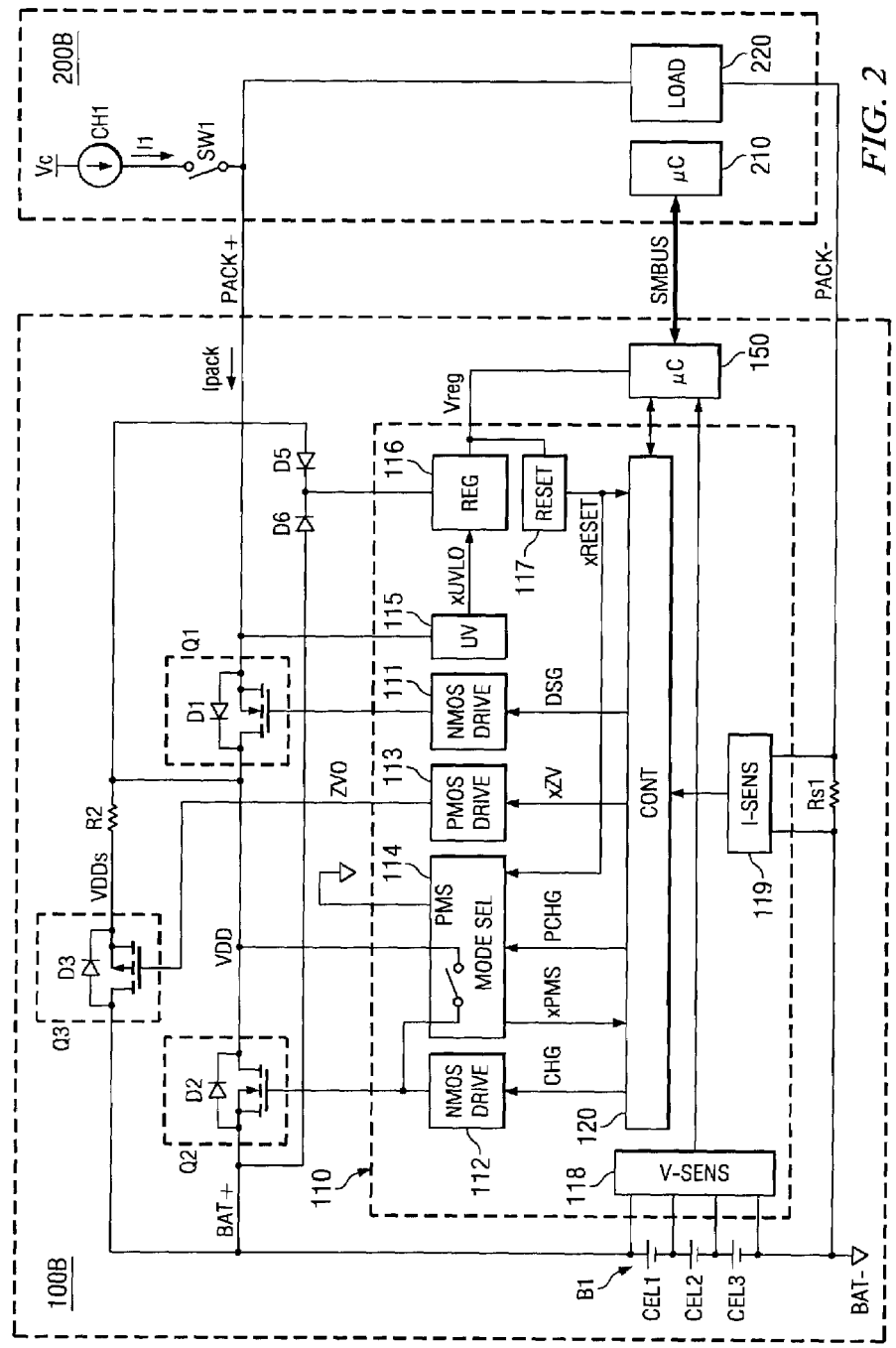
FIG. 2 is a diagram illustrating a second constitution example of the battery device in an embodiment of the present invention.
Figure 3:
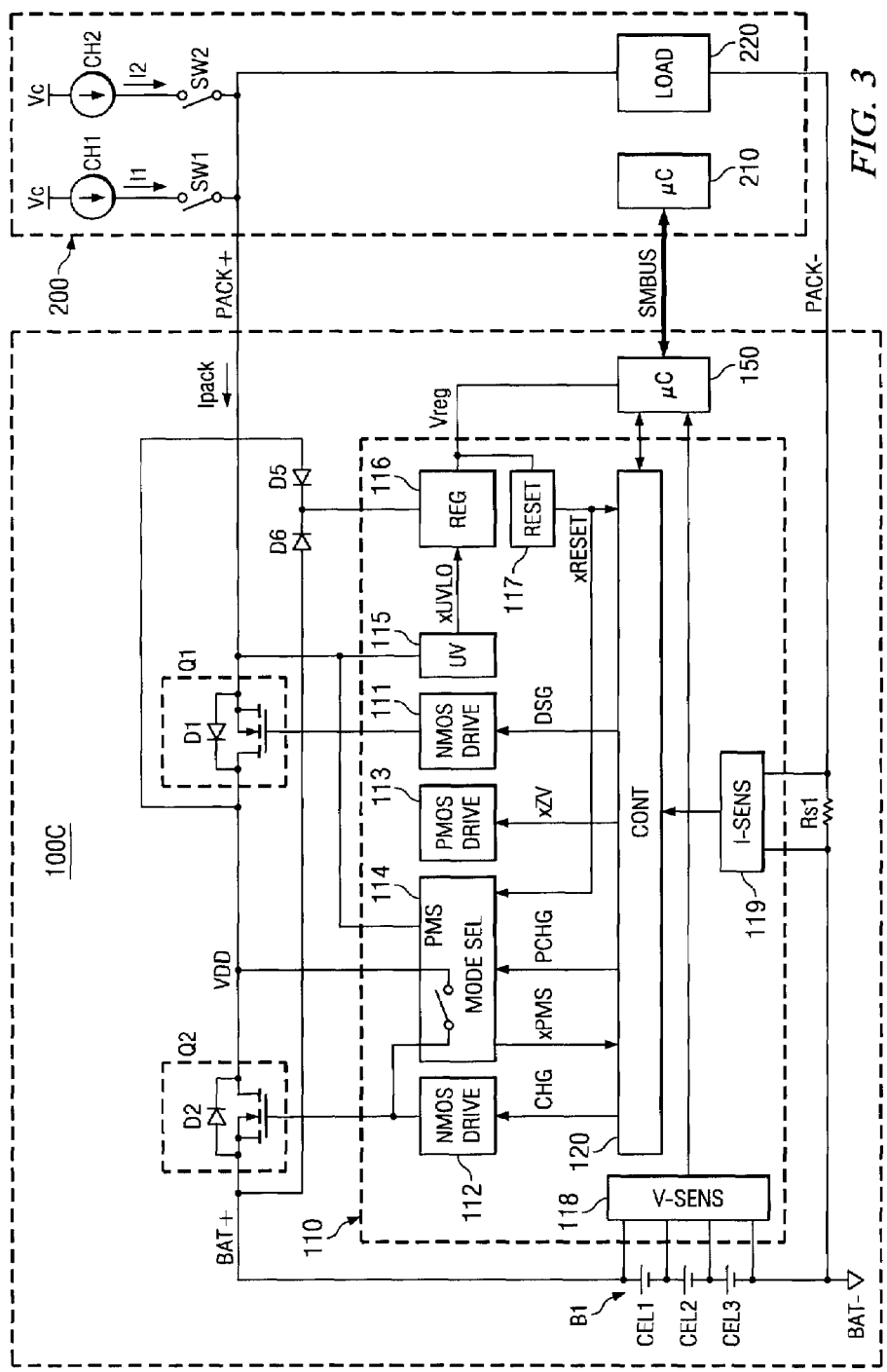
FIG. 3 is a diagram illustrating a third constitution example of the battery device in an embodiment of the present invention.

FIGS. 1, 2 and 3 are diagrams illustrating the constitutions of three battery devices (100A, 100B, 100C) as embodiments of the present invention.

First of all, an explanation will be provided for the overall constitution of these battery devices. In the following, an explanation will be given in detail on protecting circuit 110 used in common in all said battery devices.

Battery device 100A shown in FIG. 1 has NMOS transistors Q1, Q2, PMOS transistor Q3, battery B1, resistor Rs1, diodes D5, D6, protecting circuit 110, and microcomputer 150. NMOS transistors Q1, Q2 correspond to an embodiment of the first switching circuit of the present invention. NMOS transistor Q1 corresponds to an embodiment of the first NMOS transistor (first transistor) of the present invention. NMOS transistor Q2 corresponds to an embodiment of the second NMOS transistor (second transistor) of the present invention. PMOS transistor Q3 corresponds to an embodiment of the second switching circuit of the present invention as well as an embodiment of the first PMOS transistor (third transistor). Resistor R1 corresponds to an embodiment of the first resistor of the present invention.

For example, battery B1 has a constitution consisting of plural battery cells, such as lithium ion cells, connected in series. In the example shown in FIG. 1, three battery cells CEL1-CEL3 are connected in series. Said NMOS transistors Q1, Q2 have there drains connected in common. The source of NMOS transistor Q1 is connected to positive electrode PACK+ of battery device 100A, and the source of NMOS transistor Q2 is connected to positive electrode BAT+ of battery B1. PMOS transistor Q3 has its source connected to the common drain of NMOS transistors Q1, Q2, and it has its drain connected via resistor R1 to positive electrode BAT+. The driving voltage generated by protecting circuit 110 is fed to the gates of NMOS transistors Q1, Q2 and the gate of PMOS transistor Q3. Resistor Rs1 for detection of current is connected between negative electrode BAT− of battery B1 and negative electrode PACK− of battery device 100A. The power feeding path through positive electrode PACK+, NMOS transistors Q1, Q2, positive electrode BAT+, negative electrode BAT−, resistor Rs1, and negative electrode PACK− corresponds to the first power feeding path of the present invention. The power feeding path through positive electrode PACK+, NMOS transistor Q1 (body diode D1), PMOS transistor Q3, resistor R1, positive electrode BAT+, negative electrode BAT−, resistor Rs1, and negative electrode PACK− corresponds to the second power feeding path of the present invention. Diodes D5 and D6 have their cathodes connected in common. The anode of diode D5 is connected to the common drain of NMOS transistors Q1, Q2. The anode of diode D6 is connected to positive electrode BAT+. The voltage generated in the cathodes of diodes D5, F6 connected in common is fed to power source circuit 116 to be explained later.

Said protecting circuit 110 generates a driving voltage fed to the gates of NMOS transistors Q1, Q2 and PMOS transistor Q3 to control them ON/OFF. For example, communication is performed via a prescribed interface with microcomputer 150, and a set value sent from microcomputer 150 is stored in an internal register. Then, according to the set value stored in the register, NMOS transistors Q1, Q2 and PMOS transistor Q3 are turned ON/OFF.

Also, protecting circuit 110 selects the charging mode of battery B1 corresponding to the voltage input to terminal PMS when the battery voltage falls nearly to zero volts. That is, when terminal PMS is connected to negative electrode BAT− (reference potential) (FIGS. 1 and 2), while the drain and gate of NMOS transistor Q2 are cut off, charging of battery B1 is started, and, when terminal PMS is connected to positive electrode PACK+ (FIG. 3), charging is started for battery B1 while the drain and the gate of NMOS transistor Q2 are connected.

In addition, protecting circuit 110 has a function in that the charging current of battery B1 is monitored based on the voltage generated across resistor Rs1, and, when an overcurrent is detected, NMOS transistors Q1, Q2 are cut off, and it has a function in that the voltage of the battery cells CEL1-CEL3 selected corresponding to the set value of the register is detected, and it is output to microcomputer 150.

Said microcomputer 150 monitors the charge/discharge current of battery B1 and the voltage of each cell. If an abnormality takes place, such as overcharging, overdischarge, overcurrent, etc., protecting circuit 110 is set such that NMOS transistors Q1, Q2 are turned ON. Also, it performs a treatment which integrates the charge/discharge current of battery B1 to predict the remaining charge of the battery, and a treatment which sets the detection threshold of overcurrent in protecting circuit 110.

Also, microcomputer 150 communicates with electronic equipment 200 via interface with an SMBUS or other chip, and it provides the remaining charge of the battery of battery device 100A and other information to electronic equipment 200.

Figure 10:
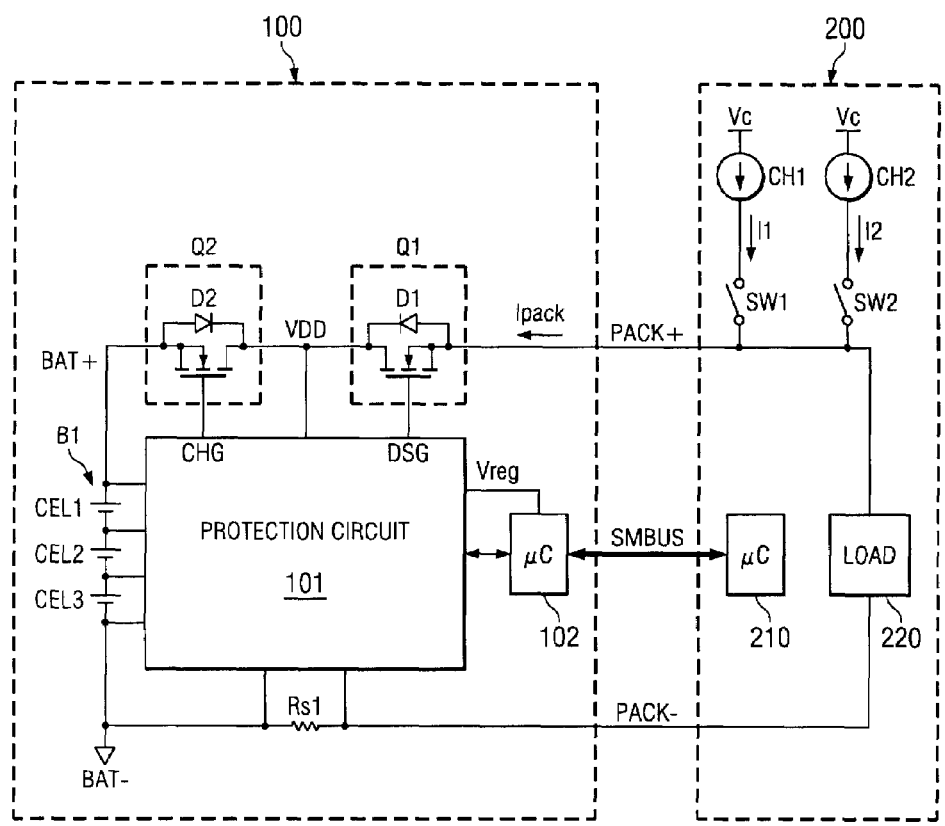
FIG. 10 is a diagram illustrating a constitution example of a battery device having a protecting circuit that cuts the power feeding path on the side of the positive electrode of the battery by means of NMOS transistors.
Figure 11A:
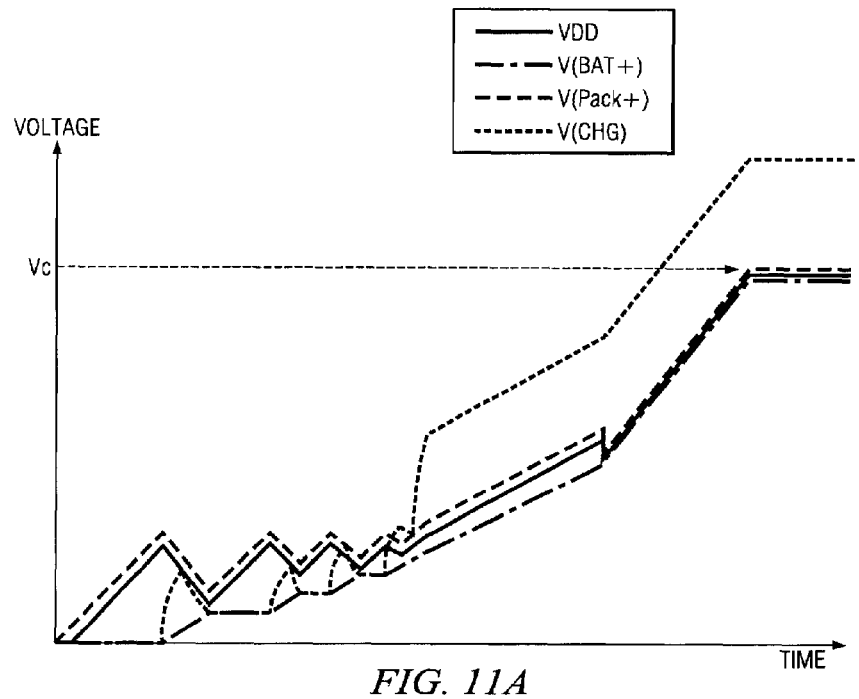
FIGS. 11A-D are diagrams illustrating an example of the charging operation when the battery voltage falls nearly to zero volts in the battery device shown in FIG. 10.
Figure 11B:
Figure 11C:
Figure 11D:

Said electronic equipment 200 connected to battery device 100A adopts the same part numbers as those shown in FIG. 10. Consequently, they will not be explained again. Said battery device 100B shown in FIG. 2 has resistor R2 in place of resistor R1 in battery device 100A shown in FIG. 1. Resistor R2 corresponds to the second resistor of the present invention, and it is inserted in the path between the common drain of NMOS transistors Q1, Q2 and the source of PMOS transistor Q3. In battery device 100B, the power feeding path through positive electrode PACK+, NMOS transistor Q1 (body diode D1), resistor R2, PMOS transistor Q3, positive electrode BAT+, negative electrode BAT−, resistor Rs1, and negative electrode PACK− corresponds to the second power feeding path of the present invention. Also, for electronic equipment 200B shown in FIG. 2, charging circuit CH2 for precharging and switching circuit SW2 are deleted from electronic equipment 200.

For battery device 100C shown in FIG. 3, PMOS transistor Q3 and resistor R1 are deleted from battery device 100A shown in FIG. 1, and terminal PMS of protecting circuit 110 is connected to positive electrode PACK+.

In the following, an explanation will be given in detail regarding the constitution of protecting circuit 110.

For example, as shown in FIGS. 1-3, protecting circuit 110 has drivers 111, 112 of the NMOS transistors, driver 113 of the PMOS transistor, mode selecting circuit 114, low voltage operation lock circuit 115, power source circuit 116, reset circuit 117, cell voltage detector 118, overcurrent detector 119, and controller 120.

Drivers 111 and 112 are an embodiment of the first switch driver of the present invention.

Driver 111 is an embodiment of the first driver of the present invention.

Driver 112 is an embodiment of the second driver of the present invention.

Driver 113 is an embodiment of the second switch driver (third driver) of the present invention.

Power source circuit 116 is an embodiment of the power source circuit of the present invention.

Said low voltage operation lock circuit 115 is an embodiment of the power source monitoring circuit of the present invention.

Controller 120 is an embodiment of the controller of the present invention.

Driver 111 generates a driving voltage fed to the gate of NMOS transistor Q1 corresponding to control signal DSG output from controller 120. Said driver 111, for example, has a charge pump circuit or another boosting circuit, and, when the control signal DSG is at high level, the voltage of the source (that is, positive electrode PACK+) of NMOS transistor Q1 is boosted and fed to the gate of NMOS transistor Q1.

Driver 112 generates a driving voltage fed to the gate of NMOS transistor Q2 corresponding to control signal CHG output from controller 120. Driver 112, for example, has a charge pump circuit or another boosting circuit, and when control signal CHG is at high level, it boosts the voltage of the source (that is positive electrode BAT+) of NMOS transistor Q2 and feeds it to the gate of NMOS transistor Q2.

Driver 113 generates a driving voltage fed to the gate of PMOS transistor Q3 corresponding to control signal xZV output from controller 120. Driver 113, for example, has a clamp circuit, and it generates driving voltage ZVO lower than voltage VDD generated at the source of PMOS transistor Q3 (that is the common drain of NMOS transistors Q1, Q2) when control signal xZV is at low level, and feeds the generated driving voltage to the gate of PMOS transistor Q3.

FIG. 4 is a diagram illustrating an example of the constitution of driver 113. For example, as shown in FIG. 4, driver 113 has differential amplifier OP1, reference voltage generator U1, NMOS transistor Q4, and resistors R3-R7. Resistor R3 is connected between the common drain of NMOS transistors Q1, Q2 and the output terminal of driving voltage ZVO. Resistor R6 is connected between the output terminal of driving voltage ZVO and the negative-side input terminal of differential amplifier OP1. Resistor R7 is connected between the negative-side input terminal of differential amplifier OP1 and the reference potential (negative electrode BAT−). The drain of NMOS transistor Q4 is connected via resistor R4 to the output terminal of driving voltage ZVO, its source is connected via resistor R5 to the reference potential, and its gate is connected to the output of differential amplifier OP1. Reference voltage generator U1 generates reference voltage Vref and inputs it to the positive-side input terminal of differential amplifier OP1. Differential amplifier OP1 is a circuit that receives power source voltage Vreg generated in power source circuit 116 and works. It amplifies the difference between the voltage input to positive-side input terminal (+) and the voltage input to negative-side input terminal (−), and outputs it to the gate of NMOS transistor Q4. Also, said differential amplifier OP1 performs said amplification operation when control signal xZV is at low level. When control signal xZV is at high level, a low level signal is output to turn OFF NMOS transistor Q4.

FIG. 5 illustrates the operation of driver 113 when the battery voltage falls nearly to zero volts.

FIG. 5(A) is a diagram illustrating voltage VDD generated at the common drain of NMOS transistors Q1, Q2 and driving voltage ZVO output from driver 113. FIG. 5(B) is a diagram illustrating signal xUVLO output from low voltage operation lock circuit 115. FIG. 5(C) is a diagram illustrating power source voltage Vreg generated in power source circuit 116. FIG. 5(D) is a diagram illustrating reset signal xRESET output from reset circuit 117. FIG. 5(E) is a diagram illustrating control signal xZV output from controller 120.

When charging current I2 is fed from charging circuit CH2 of electronic equipment 200 while the battery voltage has fallen nearly to zero volts, charging current I2 flows via body diode D1 between the drain and source of NMOS transistor Q1 to the drain of NMOS transistor Q1, so that voltage VDD of the drain rises. When this voltage is lower than a prescribed level, low level signal xUVLO is output from low voltage operation lock circuit 115, to be explained later (FIG. 5(B)), and power source circuit 116 stops feeding power source voltage Vreg (FIG. 5(C)).

When power source voltage Vreg is not fed from power source circuit 116, differential amplifier OP1 does not work. Consequently, no driving voltage is fed to the gate of NMOS transistor Q4, and NMOS transistor Q4 is turned OFF. Consequently, driving voltage ZVO becomes the value obtained by voltage dividing of voltage VDD by the serial circuit of resistors R6, R7 and resistor R3. If the resistances of resistors R6, R7 are much larger than the value of the resistance of resistor R3, driving voltage ZVO becomes nearly equal to voltage VDD (FIG. 5(A)).

When voltage VDD reaches a prescribed level, signal xUVLO of low-voltage operation lock circuit 115 changes to high level, and power source circuit 116 is started (FIG. 5(C)). Right after the start of power source circuit 116, low level reset signal xRESET is output to reset circuit 117 (FIG. 5(D)), and when it is received, controller 120 enters a prescribed initial state. Said controller 120 outputs low level control signal xZV in this initial state (FIG. 5(E)). Differential amplifier OP1 receives said low level control signal xZV and starts an amplification operation.

Differential amplifier OP1 generates the gate voltage of NMOS transistor Q4 such that the value obtained by voltage dividing of driving voltage ZVO by resistors R6 and R7 is equal to reference potential Vref. Consequently, driving voltage ZVO is clamped to a prescribed voltage (Vc1) determined by the resistance values of resistors R6 and R7 and reference voltage Vref.

For example, if the resistance value of resistor R6 is 119 kΩ, the resistance of resistor R7 is 60 kΩ, and reference voltage Vref is 1.7 V, voltage Vc1 is represented by the following formula.

[Mathematical Formula 1]

$$Vc1 = 1.7 \times (119K + 60K)/60K \approx 3.5[V] \quad (1)$$

Because control is performed such that driving voltage ZVO is clamped to a prescribed voltage Vc1, as voltage VDD rises, the resistance value of NMOS transistor Q3 decreases. However, when voltage VDD rises above a prescribed level, even if the resistance of NMOS transistor Q4 is set at zero (that is, even if NMOS transistor Q4 is short circuited), driving voltage ZVO still cannot be clamped to voltage Vc1, and driving voltage ZVO starts rising and rises above voltage Vc1.

For example, if the resistance value of resistor R3 is 5 kΩ, the resistance value of resistor R4 is 4.2 kΩ, and the resistance of resistor R5 is 800Ω (0.8 kΩ), when voltage VDD rises above about 7 V, driving voltage ZVO starts rising. In this case, driving voltage ZVO is represented by the following formula.

[Mathematical Formula 2]

$$ZVO \approx VDD \times (4.2K + 0.8K + 5K)/5K = VDD/2 \quad (2)$$

In this state, when voltage VDD rises, due to the voltage generated across resistor R5, the source voltage of NMOS transistor Q4 rises, and, corresponding to this voltage, the gate voltage of NMOS transistor Q4 also rises. When the gate voltage reaches the upper limit value that can be output from differential amplifier OP1, the current flowing to NMOS transistor Q4 becomes a prescribed current limited by said upper limit.

For example, if the upper limit of the output voltage of differential amplifier OP1 is 3 V, and the threshold of NMOS transistor Q4 is 0.6 V, when said upper limit of 3 V is reached, the current flowing in resistor R5 becomes 3 mA. As a result, the current of NMOS transistor Q4 is limited to 3 mA, and the voltage generated across resistor R3 (5 kΩ) is limited to a maximum value of 15 V (=3 mA×5 kΩ). That is, the voltage between the gate and source of PMOS transistor Q3 is limited to at most 15 V.

When voltage VDD is clamped to the aforementioned 3 steps, driver 113 generates driving voltage ZVO lower than voltage VDD, and it turns ON PMOS transistor Q3. When PMOS transistor Q3 is turned ON, battery B1 is charged by the precharging current flowing through it. When the voltage of battery B1 reaches a prescribed level, controller 120 switches control signal xZV from low level to high level (FIG. 5(E)). When control signal xZV becomes high level, the amplification operation of differential amplifier OP1 is stopped, and NMOS transistor Q4 is turned OFF. Consequently, driving voltage ZVO becomes nearly equal to voltage VDD. As a result, PMOS transistor Q3 is switched from ON to OFF, and precharging of battery B1 is stopped. The above is an explanation of driver 113.

Mode selection circuit 114 is a circuit for selecting the charging mode of battery B1 when the battery voltage falls nearly to zero volts. That is, when terminal PMS is connected to negative electrode BAT– (FIGS. 1 and 2), mode selecting circuit 114 starts charging of battery B1 while the drain and gate of NMOS transistor Q2 are cut off. On the other hand, when terminal PMS is connected to positive electrode PACK+ (FIG. 3), mode selecting circuit 114 starts charging battery B1 while the drain and gate of NMOS transistor Q2 are connected. That is, by feeding the voltage VDD generated at the common drain of NMOS transistors Q1, Q2 to the gate of NMOS transistor Q2, charging of battery B1 is started while NMOS transistor Q2 is turned ON.

Figure 6:
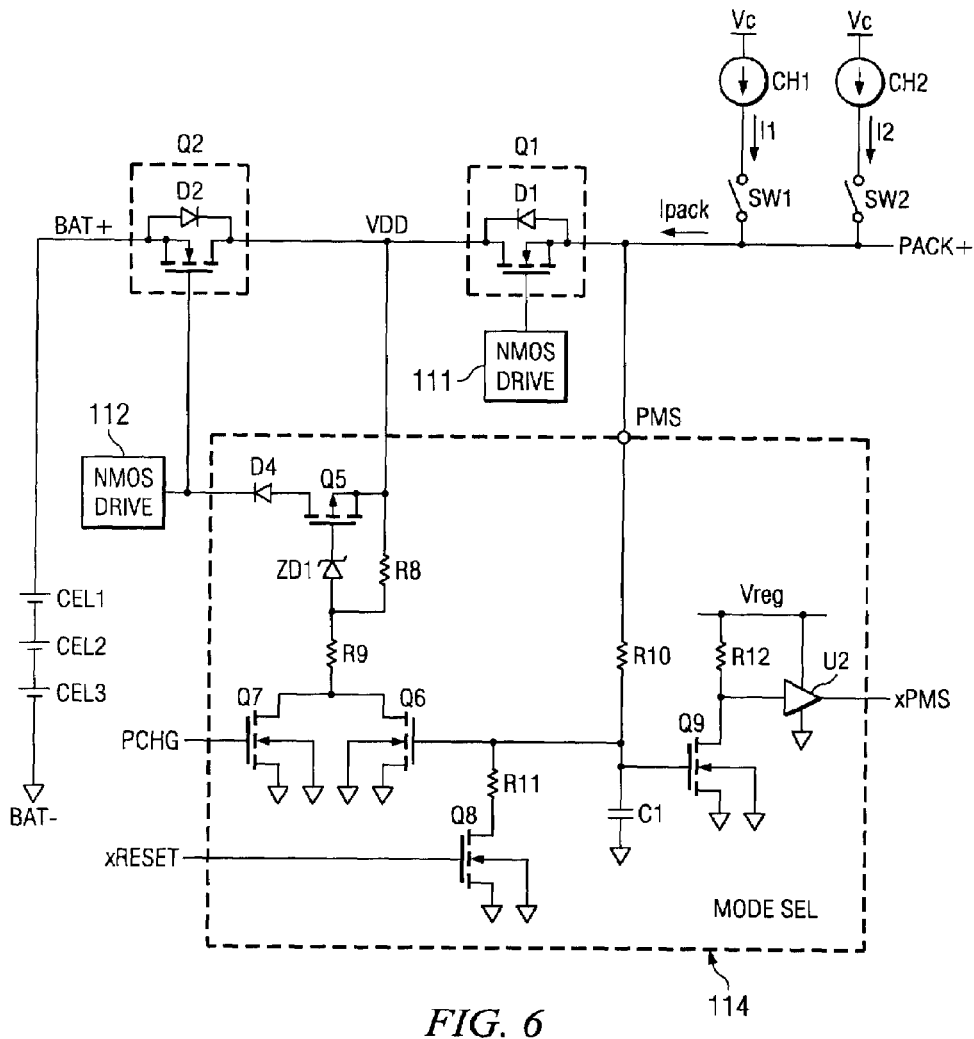
FIG. 6 is a diagram illustrating a constitution example of the mode selector.

FIG. 6 is a diagram illustrating an example of the constitution of mode selecting circuit 114. Said mode selecting circuit 114 shown in FIG. 6 has the following parts: PMOS transistor Q5, NMOS transistors Q6-Q9, diode D4, Zener diode ZD1, resistors R8-R12, capacitor C1 and buffer circuit U2. Also, the circuit containing PMOS transistor Q5, NMOS transistors Q6-Q8, Zener diode ZD1, resistors R8-R11, and capacitor C1 is an embodiment of the driving voltage feeding circuit of the present invention. PMOS transistor Q5 is an embodiment of the second PMOS transistor of the present invention.

The circuit containing said NMOS transistors Q6-Q8, Zener diode ZD1, resistors R8-R11, and capacitor C1 is an embodiment of the transistor driver of the present invention. The circuit containing NMOS transistor Q9, resistor R12 and buffer circuit U2 is an embodiment of the judgment circuit of the present invention. PMOS transistor Q5 is connected between the drain and gate of NMOS transistor Q2. In the example of FIG. 6, the drain of PMOS transistor Q5 is connected via diode D4 to be explained later to the gate of NMOS transistor Q2, and the source of PMOS transistor Q5 is connected to the drain of NMOS transistor Q2.

Diode D4 is connected in series with PMOS transistor Q5 such that the current flowing to PMOS transistor Q5 is stopped by means of the driving voltage of driver 112. In the example shown in FIG. 6, the anode of diode D4 is connected to the drain of PMOS transistor Q5, and the cathode of diode 4 is connected to the gate of NMOS transistor Q2. The cathode of Zener diode ZD1 is connected to the gate of PMOS transistor Q5, and its anode is connected in common to the drains of NMOS transistors Q6, Q7 via resistor R9. The sources of NMOS transistors Q6, Q7 are connected to a reference potential (negative electrode BAT–). Resistor R8 is connected between the source of PMOS transistor Q5 and the anode of the Zener diode. Resistor R10 and capacitor C1 are connected in series between terminal PMS and the reference potential. Resistor R10 is connected to the side of terminal PMS, and capacitor C1 is connected to the reference potential side. The connecting point between resistor R10 and capacitor C1 is connected to the gates of NMOS transistors Q6, Q9, and, at the same time, it is connected via the serial circuit of resistor R11 and NMOS transistor Q8 to the reference potential. The drain of NMOS transistor Q9 is connected to the feeding line of power source voltage Vreg via resistor R12, and its source is connected to the reference potential. The voltage generated at the drain of NMOS transistor Q9 is input to buffer circuit U2 which receives power source voltage Vreg and works. Output signal xPMS of buffer circuit U2 is output as a signal indicating the connection signal of terminal PMS to controller 120.

By means of mode selection circuit 116 shown in FIG. 6 with the aforementioned constitution, when terminal PMS is connected to the reference potential (negative electrode BAT–), the gate voltages of NMOS transistors Q6, Q9 become the reference potential, so that the transistors are turned OFF.

When the battery voltage falls nearly to zero volts, as power source circuit 116 is started, control signal PCHG output from controller 120 becomes low level, and NMOS transistor Q7 is turned OFF. In this state, since NMOS transistor Q6 is also turned OFF, the current flowing in resistor R8 becomes zero, and Zener diode ZD1 becomes OFF. Consequently, the voltage at the gate and that at the source of PMOS transistor Q5 become nearly equal, and PMOS transistor Q5 is turned OFF.

Also, when power source circuit 116 is started by charging current Ipack to generate power source voltage Vreg, the drain voltage of PMOS transistor Q9 becomes equal to power source voltage Vreg, and high level signal xPMS is output from buffer circuit U2. On the other hand, when terminal PMS is connected to positive electrode PACK+, the voltage at terminal PMS rises due to charging current Ipack fed from charging circuit CH1 or CH2.

When the battery voltage falls nearly to zero volts, and power source circuit 116 is not started, reset signal xRESET at low level is output from reset circuit 117, and NMOS transistor Q8 is turned OFF. Since the voltage of terminal PMS rises in this state, due to the current flowing from terminal PMS via resistor R10, the voltage of capacitor C1 rises, and NMOS transistors Q6, Q9 are turned ON.

When NMOS transistor Q6 is turned ON, since current flows in resistor R8, the voltage falls. Corresponding to the rise in voltage VDD, the voltage drop across resistor R8 increases. When it exceeds "Vzd+Vth" as the sum of Zener voltage Vzd of Zener diode ZD1 and threshold voltage Vth of PMOS transistor Q5, PMOS transistor Q5 is turned ON. As a result, the driving voltage is fed via PMOS transistor Q5 and diode 4 to the gate of NMOS transistor Q2, and NMOS transistor Q2 is turned ON. Also, when power source circuit 116 is started by means of charging current Ipack, and power source voltage Vreg is generated, the drain voltage of PMOS transistor Q9 becomes equal to the reference potential, and low level signal xPMS is output from buffer circuit U2. The above is an explanation of mode selecting circuit 114.

Said low voltage operation lock circuit 115 works as follows: when the voltage of positive electrode PACK+ is lower than a prescribed voltage, low level signal xUVLO that stops feeding of power source voltage Vreg is output from power source circuit 116, and, when the voltage of positive electrode PACK+ is over the prescribed voltage, signal xUVLO is switched from low level to high level, and power source circuit 116 is started. Said power source circuit 116 generates power source voltage Vreg fed to the various circuits inside protecting circuit 110 and microcomputer 150.

For example, power source circuit 116 is composed of a linear regulator with a low-dropout. The voltage fed from the common drain of NMOS transistors Q1, Q2 via diode D5, or the voltage fed from positive electrode BAT+ via diode D6 is input, and the input voltage is lowered to generate a prescribed value of power source voltage Vreg.

Reset circuit 117 outputs reset signal xRESET at low level when power source voltage Vreg generated by power source circuit 116 is lower than a prescribed voltage, and, it switches reset signal xRESET from low level to high level when power source voltage Vreg is over the prescribed voltage. Said cell voltage detector 118 selects one from three battery cells CEL1-CEL3 according to the control of controller 120, and detects the voltage of the selected battery cell. Then, the detection result is output to microcomputer 150. Said overcurrent detector 119 detects whether the voltage generated across resistor Rs1 is over the threshold set by controller 120, and it outputs the detection result to controller 120. Said controller 120 is a circuit that works upon receiving power source voltage Vreg fed to it, and it outputs the control signal for controlling the various circuits in protecting circuit 110. That is, controller 120 communicates with microcomputer 150 via a prescribed interface, and stores the set value sent from microcomputer 150 in an internal register. Then, the various circuits inside protecting circuit 110 are controlled corresponding to the set value in the register.

For example, corresponding to the set value stored in the register, the following operations are performed: control of ON/OFF of transistors Q1-Q3, setting of the overcurrent detection threshold in overcurrent detector 119, selection of the battery cell as the detection object by cell voltage detector 118, etc. Also, controller 120 monitors the detection result of overcurrent detector 119, and if an overcurrent over the threshold it is detected, it immediately sets control signals CHG, DSG at low level. As a result, NMOS transistors Q1, Q2 are cut off, and battery B1 is protected from the overcurrent.

In addition, when reset signal xRESET at low level is input when power source circuit 116 is started or the like, the set value of the register is initialized. In this case, controller 120 sets all of control signals CHG, DSG, xZV, PCHG at low level. That is, when low level reset signal xRESET is received by controller 120 and it is started, it outputs control signals CHG, DSG, xZV so that drivers 111, 112 stop the boosting operation, and driver 113 generates driving voltage ZVO.

Consequently, in battery device 100A shown in FIG. 1 and battery device 100B shown in FIG. 2, when controller 120 is started while the voltage of battery B1 falls nearly to zero volts, NMOS transistors Q1, Q2 are turned OFF, PMOS transistor Q3 is turned ON, and battery B1 is charged by the current flowing in PMOS transistor Q3.

On the other hand, when the low level reset signal xRESET is switched to high level, if low level signal xPMS indicating that a voltage is fed from positive electrode PACK+ to terminal PMS is output from mode selecting circuit 114, controller 120 outputs control signal PCHG at high level so that PMOS transistor Q5 of mode selecting circuit 114 is turned ON.

Consequently, for battery device 100C shown in FIG. 3, when controller 120 is started while the voltage of battery B1 falls nearly to zero volts, NMOS transistor Q2 has the gate and drain connected, and it is turned ON, and battery B1 is charged by the current flowing in NMOS transistor Q2.

When battery B1 is charged, microcomputer 150 monitors the voltage of battery B1. When if it is judged that the voltage of battery B1 has reached the voltage needed for the stable boosting operation of drivers 111, 112, microcomputer 150 writes the set value in the register of controller 120 to set control signals CHG, DSG, xZV at high level, and to set control signal PCHG at low level.

Corresponding to the set value of the register written by microcomputer 150, controller 120 sets control signals CHG, DSG, xZV at high level, sets control signal PCHG at low level, turns OFF PMOS transistors Q3 and Q5, and turns ON NMOS transistors Q1, Q2. As a result, battery B1 is charged by the current that flows in NMOS transistors Q1, Q2.

In the following, an explanation will be given regarding the operation of battery devices 100A, 100B, 100C having the aforementioned constitution.

<Explanation of the Operation of Battery Device 100A (FIG. 1)>

First of all, an explanation will be provided for the operation of battery device 100A with reference to FIG. 7. FIG. 7 illustrates the operation of battery device 100A when the battery voltage falls nearly to zero volts.

Figure 7A:
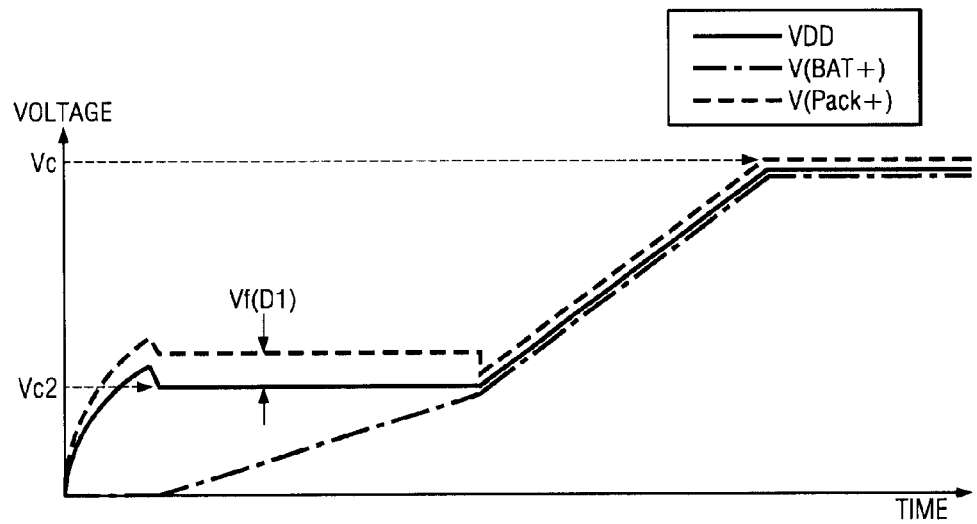
FIGS. 7 A-E are diagrams illustrating an example of the operation of the battery device shown in FIG. 1.

FIG. 7(A) is a diagram illustrating voltage V (PACK+) of positive electrode PACK+, voltage VDD generated on the common drain of NMOS transistors Q1, Q2, and voltage V (BAT+) of positive electrode BAT+.

Figure 7B:

FIG. 7(B) is a diagram illustrating the state (ON/OFF) of PMOS transistor Q3.

Figure 7C:

FIG. 7(C) is a diagram illustrating the state (ON/OFF) of NMOS transistors Q1, Q2.

Figure 7D:

FIG. 7(D) is a diagram illustrating the charging current Ipack fed from electronic equipment 200.

Figure 7E:

FIG. 7(E) is a diagram illustrating the start state of microcomputer 150.

Step ST10:

The voltage of battery B1 is zero volts, and switching circuit SW2 is set ON, so that precharging is started by charging current I2.

Step ST10:

In this case, because both NMOS transistors Q1, Q2 of battery device 100A are OFF, charging current Ipack (=I2) fed from electronic equipment 200 to positive electrode PACK+ flows via body diode D1 of NMOS transistor Q1 to the drain of NMOS transistor Q1, and voltage VDD rises (FIG. 7(A)).

Step ST10

Due to rise of voltage VDD, power source circuit 116 is started and power source voltage Vreg is generated. As a result, said power source voltage Vreg is received and driver 113 starts to operate. Also, upon receiving power source voltage Vreg, microcomputer 150 is started (FIG. 7(E)).

Step ST10:

When voltage VDD reaches prescribed voltage Vc, clamping of driving voltage ZVO is started by driver 113. Voltage Vc is represented by the following formula.

[Mathematical Formula 3]

$$Vc2 = Vc1 + Egs(Q3) \quad (3)$$

In formula 3, "Egs(Q3)" represents the voltage between the gate and source of PMOS transistor Q3. With said "Egs(Q3)", PMOS transistor Q3 is turned ON (FIG. 7(B)), and charging current Ipack (=I2) flows to battery B1 (FIG. 7(D)). That is, battery B1 is pre charged with the following power feeding path:

PACK+ ... Q1(D1) ... Q3 ... R1 ... BAT+ ... B1 ... BAT− ... Rs1 ... PACK−;

In this case, because charging current Ipack (=I2) is constant, "Egs(Q3)" of PMOS transistor Q3 is constant. Consequently, voltage VDD is kept at constant voltage Vc shown in formula 3.

Also, voltage V (PACK+) of positive electrode PACK+ is higher than voltage Vc represented by formula 3 by the forward voltage of body diode D1.

Step ST10:

Said microcomputer 150 monitors the voltage of battery B1 based on the detection value of cell voltage detector 118. When the voltage of battery B1 reaches the voltage needed for the stable boosting operation of drives 111, 112, microcomputer 150 writes the set value in the register of controller 120 so that control signals CHG, DSG, xZV become high level, respectively. As a result, PMOS transistor Q3 is turned OFF, and NMOS transistors Q1, Q2 are turned ON (FIGS. 7(B), (C)). As a result, battery B1 is charged with the following power feeding path:

PACK+...Q1 (D1)...Q3...R1...BAT+...B1...BAT-...Rs1...PACK-;

Step ST10:

Also, when microcomputer 150 turns ON NMOS transistors Q1, Q2, electronic equipment 200 turns OFF switching circuit SW2 and turns ON switching circuit SW1. As a result, battery B1 is charged at a high rate with current (I1) when pre charged (FIG. 7(D)).

Step ST10:

When the voltage of battery B1 reaches the upper limit value (Vc) of the output voltage of charging circuit CH1, charging current I1 becomes zero, and charging of battery B1 comes to an end (FIG. 7(D)).

<Explanation of the Operation of Battery Device 100B (FIG. 2)>

In the following, an explanation will be given regarding the operation of battery device 100B with reference to FIG. 8.

FIG. 8 illustrates the operation of battery device 100B when the battery voltage falls nearly to zero volts.

Figure 8A:
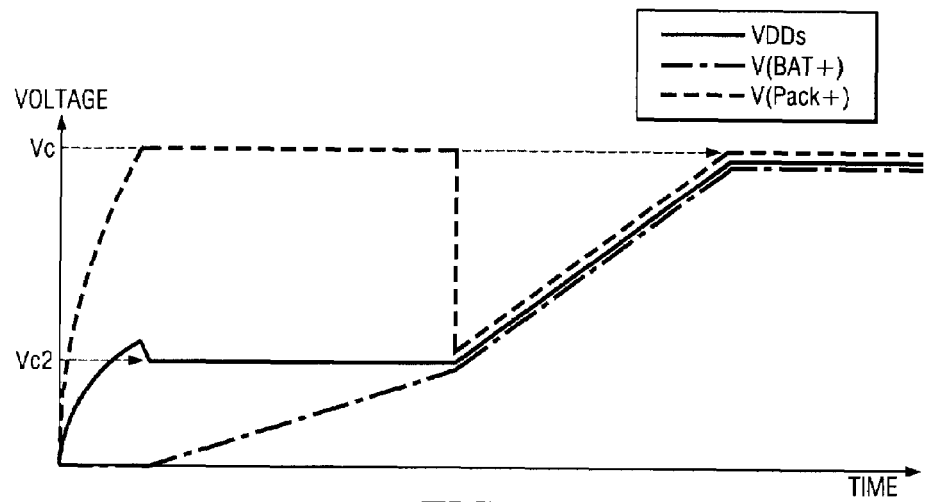
FIGS. 8 A-E are diagrams illustrating an example of the operation of the battery device shown in FIG. 2.

FIG. 8(A) is a diagram illustrating voltage V (PACK+) of positive electrode PACK+, voltage ADDS of PMOS transistor Q3, and voltage V (BAT+) of positive electrode BAT+.

Figure 8B:

FIG. 8(B) is a diagram illustrating the state (ON/OFF) of PMOS transistor Q3.

Figure 8C:

FIG. 8(C) is a diagram illustrating the state (ON/OFF) of NMOS transistors Q1, Q2.

Figure 8D:

FIG. 8(D) is a diagram illustrating charging current Ipack fed from electronic equipment 200B.

Figure 8E:

FIG. 8(E) is a diagram illustrating the state of start of microcomputer 150.

Step STD.:

While the voltage of battery B1 is at zero volts, switching circuit SW1 is turned ON, and precharging is started by charging current I1.

Step STD.:

In this case, because both NMOS transistors Q1, Q2 of battery device 100B are OFF, charging current Ipack (=I1) fed from electronic equipment 200B to positive electrode PACK+ flows via body diode D1 of NMOS transistor Q1 to the drain of NMOS transistor Q1, and voltage VDD rises.

Step STD.:

When voltage VDD rises, power source circuit 116 is started, and power source voltage Vreg is generated. As a result, said power source voltage Vreg is received, and operation of driver 113 is started. Also, when power source voltage Vreg is fed and received, microcomputer 150 is started (FIG. 8(E)).

Step STD.:

When the fall in voltage across resistor R2 due to current I1 is sufficiently larger than upper limit voltage Vc that can be output from charging circuit CH1, the voltage of positive electrode PACK+ reaches said upper limit voltage Vc (FIG. 8(A)). Also, voltage VDD becomes a voltage below upper limit voltage Vc by the forward voltage of body diode D1.

When voltage VDD rises, due to the clamping operation of driver 113, voltage ADDS of the source of PMOS transistor Q3 is clamped to voltage Vc of formula 3 (FIG. 8(A)), and PMOS transistor Q3 is turned ON (FIG. 8(B)). In this case, current Ir2 flowing in PMOS transistor Q3 is represented by the following formula.

[Mathematical Formula 4]

$$Ir2 = (Vc - Vf(D1) - Vc2)/r2 \quad (4)$$

In formula 4, "Vf(D1)" represents the forward voltage of body diode D1, and "r2" represents the resistance value of resistor R2. Current Ir2 shown in formula 4 flows as charging current Ipack in battery B1 (FIG. 8(D)).

That is, battery B1 is charged by the current of formula 4 in the following power feeding path:

PACK+...Q1(D1)...R2...Q3...BAT+...B1...BAT-...Rs1...PACK-;

As can be seen from formula 4, by setting resistance value r2 appropriately, it is possible to freely set the magnitude of the precharge current.

Step ST205:

Said microcomputer 150 monitors the voltage of battery B1 based on the detection value of cell voltage detector 118. When the voltage of battery B1 reaches the voltage needed for the stable boosting operation of drives 111, 112, microcomputer 150 writes the set value in the register of controller 120 so that control signals CHG, DSG, xZV become high level. As a result, PMOS transistor Q3 is turned OFF, and NMOS transistors Q1, Q2 are turned ON (FIGS. 8(B), (C)). As a result, battery B1 is charged through the following power feeding path:

PACK+...Q1...Q2...BAT+...B1...BAT-...Rs1...PACK-;

Due to switching of the power feeding path, there is no fall in voltage by resistor R2, the voltage of positive electrode PACK+ rapidly falls from upper limit voltage Vc to voltage V (BAT+) of positive electrode BAT+ (FIG. 8(A)). Also, charging current Ipack fed from charging circuit CH1 rises from current Ir2 to current I1. As a result, battery B1 is charged at a high rate by current I1 larger than the precharge current in step STD.

Step ST206:

When the voltage of battery B1 reaches the upper limit value (Vc) of the output voltage of charging circuit CH1, charging current I1 becomes zero, and charging of battery B1 comes to an end (FIG. 8(D)).

<Explanation of the Operation of Battery Device 100C (FIG. 3)>

In the following, an explanation will be given regarding the operation of battery device 100C with reference to FIG. 9.

FIG. 9 illustrates the operation of battery device 100C when the battery voltage falls to nearly zero volts.

Figure 9A:
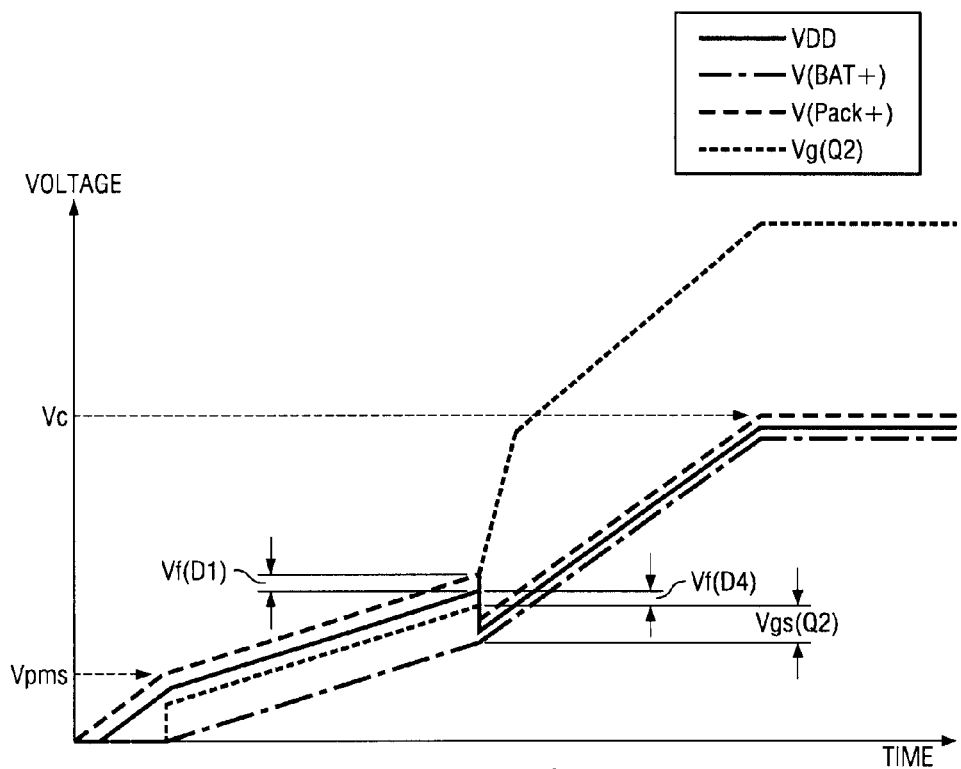
FIGS. 9 A-J are diagrams illustrating an example of the operation of the battery device shown in FIG. 3.

FIG. 9(A) shows voltage V (PACK+) of positive electrode PACK+, voltage VDD generated at the common drain of NMOS transistors Q1, Q2, voltage Vg (Q2) of the gate of NMOS transistor Q2, and voltage V (BAT+) of positive electrode BAT+.

Figure 9B:

FIG. 9(B) is a diagram illustrating the state (ON/OFF) of PMOS transistor Q5 of mode selecting circuit 114.

Figure 9C:

FIG. 9(C) is a diagram illustrating charging current Ipack fed from electronic equipment 200.

Figure 9D:
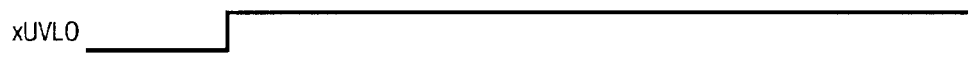

FIG. 9(D) is a diagram illustrating signal xUVLO of low voltage operation lock circuit 115.

FIG. 9(E) is a diagram illustrating power source voltage Vreg.

FIG. 9(F) is a diagram illustrating reset signal xRESET.

FIG. 9(G) is a diagram illustrating signal xPMS of mode selecting circuit 114.

FIG. 9(H) is a diagram illustrating control signal PCHG of controller 120.

FIG. 9(I) is a diagram illustrating control signal CHG of controller 120.

FIG. 9(J) is a diagram illustrating control signal DSG of controller 120.

Step ST301:

While the voltage of battery B1 is at zero volts, switching circuit SW2 is turned ON, and precharge is started by charging current I2.

Step ST302:

In this case, because both NMOS transistors Q1, Q2 of battery device 100C are OFF, charging current Ipack (=I2) fed from electronic equipment 200 to positive electrode PACK+ flows via body diode D1 of NMOS transistor Q1 to the drain of NMOS transistor Q1, and voltage VDD rises.

Step ST303:

When voltage V (PACK+) of positive electrode PACK+ input to terminal PMS reaches the prescribed voltage Vpms (FIG. 9(A)), PMOS transistor Q5 of mode selecting circuit 114 is turned ON (FIG. 9(B)), and voltage "VDD-Vf(D4)" is fed to the gate of NMOS transistor Q2. Here, "Vf(D4)" represents the forward voltage of diode D4 (see FIG. 6).

Step ST304:

Because NMOS transistor Q2 is turned ON by voltage "VDD-Vf(D4)" fed to the gate, in battery B1, charging current Ipack (=I2) flows through NMOS transistor Q2 (FIG. 9(C)).

That is, battery B1 is pre charged through the following power feeding path:

PACK+ . . . Q1 . . . Q2 . . . BAT+ . . . B1 . . . BAT− . . . Rs1 . . . PACK−;

In this case, voltage Egs (Q2) between the gate and source (positive electrode BAT+) of NMOS transistor Q2 is fixed at the voltage needed for flowing of precharge current I2. Also, voltage VDD is higher than voltage V (BAT+) by "Egs (Q2)+Vf (D4)", and voltage V (PACK+) is higher than voltage V (BAT+) by "Egs (Q2)+Vf (D4)+Vf (D1)" (FIG. 9(A)).

Step ST305:

When voltage VDD reaches the prescribed voltage that allows operation of power source circuit 116, signal xUVLO of low voltage operation lock circuit 115 is changed from low level to high level (FIG. 9(D)), and power source circuit 116 is started (FIG. 9(E)).

Step ST306:

When power source voltage Vreg rises due to start of power source circuit 116, controller 120 that receives said power source voltage Vreg is started. Because reset signal xRESET at start is at low level (FIG. 9(F)), the register of controller 120 is initialized.

On the other hand, because terminal PMS is connected to positive electrode PACK+, due to the start of power source circuit 116, although power source voltage Vreg rises, signal xPMS of mode selecting circuit 114 is still kept at low level (FIG. 9(G)).

Step ST307:

After initialization of controller 120, reset signal xRESET is switched from low level to high level (FIG. 9(G)). When reset signal xRESET becomes high level, NMOS transistor Q8 (see FIG. 6) is turned ON. Consequently, capacitor C1 discharges through resistor R11, and the gate voltages of NMOS transistors Q6, Q9 fall slowly. In this case, the voltage of capacitor C1 falls quickly corresponding to the time constant determined by the capacitance of capacitor C1 and the resistance of resistor R11. Consequently, even after reset signal xRESET changes to high level, NMOS transistors Q6, Q9 still can be kept ON for a prescribed period (th).

On the other hand, when reset signal xRESET is switched from low level to high level, NMOS transistor Q9 is kept ON until passing of period th. Consequently, in this period th, signal xPMS is kept at low level. When period th meets the timing condition of controller 120 (the minimum hold time), controller 120 judges that signal xPMS becomes low level when reset signal xRESET is switched to high level, and control signal PCHG is switched from the low level to high level (FIG. 9(H)).

Step ST308:

When control signal PCHG becomes high level, NMOS transistor Q7 (see FIG. 6) is turned on. Therefore, even if NMOS transistor Q6 is off after said period th, PMOS transistor Q5 is still driven to stay on continuously.

Step ST309:

Said microcomputer 150 monitors the voltage of battery B1 based on the detection value of cell voltage detector 118. When the voltage of battery B1 reaches the voltage needed for the stable boosting operation of drives 111, 112, microcomputer 150 writes the set value in the register of controller 120 such that control signals CHG, DSG become high level, and control signal PCHG becomes low level (FIGS. 9(H), (I), (J)). As a result, while PMOS transistor Q5 of mode selecting circuit 114 is turned OFF, and the drain and gate of NMOS transistor Q2 are cut off, NMOS transistors Q1, Q2 are turned ON by the driving voltages generated by drives 111, 112.

Step ST310:

When microcomputer 150 turns ON NMOS transistors Q1, Q2, electronic equipment 200 turns OFF switching circuit SW2 and turns ON switching circuit SW1. As a result, battery B1 is charged at a high rate with charging current I1 higher than that in the precharge mode (FIG. 9(C)).

In this case, the voltage difference between positive electrode PACK+ and positive electrode BAT+ is the value obtained by multiplying current I1 by the ON resistance of NMOS transistors Q1, Q2. When this voltage difference is made sufficiently small, voltage V (PACK+) of positive electrode PACK+ becomes lower than that in precharge by about "Egs (Q2)+Vf (D4)+Vf (D1)" (FIG. 9(A)).

Step ST311:

When the voltage of battery B1 reaches the upper limit value (Vc) of the output voltage of charging circuit CH1, charging current I1 becomes zero, and charging of battery B1 comes to an end (FIG. 8(C)).

As explained above, by means of battery devices 100A, 100B shown in FIG. 1 and FIG. 2, when the voltage of battery B1 has not reached the necessary voltage for generating the driving voltage of NMOS transistors Q1, Q2 in drives 111, 112, the boosting operation of drives 111, 112 is stopped, and PMOS transistor Q3 inserted in a power feeding path different from said transistors is turned ON by driver 113. In driver 113, by clamping voltage VDD generated in the power feeding path of PMOS transistor Q3 to a voltage lower than it, driving voltage ZVO of PMOS transistor Q3 is generated without performing a boosting operation. As a result, even if the voltage of battery B1 falls nearly to zero volts, battery B1 still can be charged by a constant charging current in a stable way.

Also, by means of battery device 100C shown in FIG. 3, if the voltage of battery B1 has not reached the necessary voltage for generating the driving voltage of NMOS transistors Q1, Q2 in drives 111, 112, voltage VDD fed from charging circuit CH2 of electronic equipment 200 is fed via a power feeding path having NMOS transistors Q1, Q2 inserted in it to the gate of NMOS transistor Q2, so that NMOS transistor Q2 is turned ON without performing a boosting operation. As a result, even if the voltage of battery B1 falls nearly to zero volts, battery B1 still can be charged by a constant charging current in a stable way.

In this way, by means of battery devices 100A-100C, it is possible to charge battery B1 with a constant charging current in a stable way. Consequently, even if the voltage of battery B1 falls nearly to zero volts, it is still possible to prevent degradation of the battery cells due to flowing of a temporary excessive charging current as would take place in battery device 100 shown in FIG. 10.

Also, by means of battery devices 100A-100C, by precharging battery B1 with a constant charging current, compared with the case of intermittent precharge shown in FIG. 11, the time needed for precharge can be shortened.

For the battery device shown in FIG. 11, during precharge, the microcomputer is turned ON/OFF repeatedly, so that it is impossible for the electronic equipment to know the state of the battery device, and it is impossible to predict the time needed for precharge.

On the other hand, by means of battery devices 100A-100C, battery B1 can be charged with a constant charging current. As a result, the power source circuit works steadily, and the microcomputer can be kept in the starting state. As a result, the electronic equipment can predict the precharge time.

In addition, if the microcomputer is turned ON/OFF repeatedly during precharge, the electronic equipment may misjudge that the battery device is in an abnormal state. However, such misjudgment can be prevented by means of battery devices 100A-100C.

In addition, by means of battery devices 100A-100C, battery B1 can be charged with a constant charging current, so that it is possible to suppress oscillation in the voltage of positive electrode PACK+ as shown in FIG. 11. For the microcomputer on the side of the electronic equipment, such state may be judged based on the voltage of the positive electrode of the battery device, so that when oscillation as shown in FIG. 11 is detected, a misjudgment may be made that there is an abnormality in the battery device. However, such misjudgment can be prevented by means of battery devices 100A-100C.

In particular, battery device 100A generates voltage ZVO lower than voltage VDD generated in the path between positive electrode PACK+ and PMOS transistor Q3, and feeds it as a driving voltage to the gate of PMOS transistor Q3. As a result, when switching is made from the state of charging via PMOS transistor Q3 to the state of charging via NMOS transistors Q1, Q2, variation in the voltage of positive electrode PACK+ can be suppressed to be minute.

Also, battery device 100C feeds voltage VDD generated in the path between positive electrode PACK+ and NMOS transistor Q2 as a driving voltage to the gate of NMOS transistor Q2. Consequently, when switching is made from the state of ON of NMOS transistor Q2 to the state of boosting driving of the gates of NMOS transistors Q1, Q2, variation in the voltage of positive electrode PACK+ can be suppressed to be minute.

For battery device 100B, resistor R2 is inserted between positive electrode PACK+ and PMOS transistor Q3, and voltage ZVO lower than voltage ADDS is generated in the path between resistor R2 and PMOS transistor Q3, and it is fed as a driving voltage to the gate of PMOS transistor Q3. As a result, it is possible to precharge battery B1 with any current corresponding to the resistance value of resistor R2, so that there is no need to set a charging circuit for precharge on the side of the electronic equipment, and the number of parts can be reduced.

By means of battery device 100C, it is possible to precharge without setting a separate PMOS transistor for precharge, so that the number of parts can be reduced. By means of battery devices 100A, 100B, a precharge current is fed from positive electrode BAT+ of battery B1 by means of PMOS transistor Q3. As a result, even if the voltage of battery B1 falls nearly to zero volts, power source circuit 116 still can be started by means of voltage VDD on the side of the source of PMOS transistor Q3. Consequently, microcomputer 150 can be started to communicate with electronic equipment 200 (200B) from the state in which the voltage of battery B1 falls nearly to zero volts. By means of said protecting circuit 110, it is possible to construct various types of battery devices as shown in FIGS. 1-3 by setting driver 113 for driving PMOS transistor Q3 for precharge, PMOS transistor Q5 for feeding a driving voltage from the power feeding path to NMOS transistor Q2, and a circuit for driving PMOS transistor Q5 ON/OFF corresponding to the voltage at terminal PMS. As a result, it is possible to construct the battery device with common protecting circuit 110 and meeting various conditions and requirements, such as yes/no of a charging circuit for precharge in the electronic equipment, [the] necessity of communication with the battery device when the battery voltage is nearly zero volts, the number of parts of the battery device, etc.

For battery device 100A, because resistor R1 is set in the path between PMOS transistor Q3 and battery B1, it is possible to reduce the loss from PMOS transistor Q3 in precharge, and to suppress heating of PMOS transistor Q3.

By means of mode selector 116 shown in FIG. 6, it is possible to prevent current flow in the reverse direction from the output of driver 112 to PMOS transistor Q5 using diode D4 connected in series with PMOS transistor Q5. As a result, the driving voltage of driver 112 can be well-boosted with respect to the source voltage of NMOS transistor Q2, and the ON resistance of NMOS transistor Q2 can be reduced.

In the above, explanations have been provided for embodiments of the present invention. However, the present invention is not limited to these schemes, and various modifications can be made. In the aforementioned embodiments, two NMOS transistors (Q1, Q2) have their drains connected in common. However, the present invention is not limited to this scheme, and one may also connect their sources in common. In this case, there is a circuit that feeds voltage from the external power source or the battery to the sources connected in common in the initial state when the two NMOS transistors are both OFF. As a result, for each driving circuit of the two NMOS transistors, the voltage of the commonly connected sources can be boosted to generate a driving voltage. Also, if the battery device of the type shown in FIG. 3 is constructed by feeding the voltage from the external power source to the gate of the transistor on the discharge side among the two NMOS transistors, it is possible to turn ON said transistor for precharge. By controlling both of them such that the boosting operation of driver 112 is stopped if PMOS transistor Q5 of mode selecting circuit 114 is turned ON, it is possible to omit diode D4 for preventing back flow.

In the aforementioned embodiments, microcomputer 150 detects whether precharge has finished and the voltage of battery B1 has reached the proper voltage. However, one may also adopt a scheme in which this is detected by means of an internal circuit of protecting circuit 110.

The invention claimed is:
1. Battery protecting circuit comprising:
battery protecting circuit controling ON/OFF of a first switching circuit inserted in a first power feeding path between an external power source and a battery, and it has the following circuits:
a first switch driver generating a first driving voltage by boosting the voltage generated in said first power feeding path corresponding to an input control signal, and turns ON said first switching circuit with said first driving voltage;

a second switch driver generating a second driving voltage lower than the voltage generated in a second power feeding path between said external power source and said battery corresponding to the input control signal, and turns ON a second switching circuit inserted in said second power feeding path with the second driving voltage; and a controller outputting said control signal such that when the voltage of said battery reaches the voltage needed for the boosting operation of said first switch driver, said first switch driver stops the boosting operation, and said second switch driver generates said second driving voltage.

2. The battery protecting circuit described in claim 1, wherein said second switch driver generates said second driving voltage lower than the voltage generated in said second power feeding path between said external power source and said second switching circuit.

3. The battery protecting circuit described in claim 2, wherein a first resistor is inserted in said second power feeding path between said second switching circuit and said battery.

4. The battery protecting circuit described in claim 1, wherein a second resistor is inserted in said second power feeding path between said external power source and said second switching circuit; and said second switch driver generates said second driving voltage lower than the voltage generated in said second power feeding path between said second resistor and said second switching circuit.

5. The battery protecting circuit described in claim 1 comprising:

a power source circuit that generates the power source voltage of said controller based on the voltage fed to said external power source through said first power feeding path;

a reset circuit that outputs a reset signal when the power source voltage generated in said power source circuit is lower than a prescribed voltage;

Wherein said controller performs the following operation:

when said reset signal is received and it starts, it outputs said control signal such that said first switch driver stops the boosting operation, and said second switch driver generates said second driving voltage; and when a prescribed signal is input to indicate that the voltage of said battery has reached the voltage needed for performing the boosting operation of said first switch driver, it outputs said control signal such that said first switch driver starts the boosting operation, and said second switch driver stops generating said second driving voltage.

6. The battery protecting circuit described in claim 1 wherein said first switching circuit has a first NMOS transistor inserted in said first power feeding path such that the diode contained between the drain and the source becomes forward biased with respect to the charging current flowing from said external power source to said battery;

a second NMOS transistor inserted in said first power feeding path such that the diode contained between the drain and the source becomes backward biased with respect to said charging current;

said second switching circuit contains a first PMOS transistor inserted in said second power feeding path such that the diode contained between the drain and the source becomes backward biased with respect to said charging current;

said first switch driver boosts the voltage generated at the source of said first NMOS transistor and feeds it to the gate of said first NMOS transistor, and, at the same time, it boosts the voltage generated at the source of said second NMOS transistor and feeds it to the gate of said second NMOS transistor;

and said second switch driver feeds a voltage lower than the voltage generated at the source of said first PMOS transistor to the gate of said first PMOS transistor.

7. The battery protecting circuit described in claim 6, wherein said first NMOS transistor and second number NMOS transistor have their drains connected in common, and said first PMOS transistor is inserted in said second current path between the commonly connected drains of said first NMOS transistor and said second NMOS transistor and said battery.

8. Battery protecting circuit that controls ON/OFF of a switching circuit inserted in a power feeding path between an external power source and a battery, comprising:

a switch driver that generates a voltage by boosting the voltage generated in said power feeding path corresponding to an input control signal, and turns ON said switching circuit with said boosted voltage;

a driving voltage feeding circuit that feeds the voltage for turning ON said switching circuit from said external power source through said power feeding path to said switching circuit corresponding to the input control signal; and a controller that outputs said control signal such that when the voltage of said battery does not reach the voltage needed for the boosting operation of said switch driver, said switch driver stops the boosting operation and said driving voltage feeding circuit feeds a driving voltage to said switching circuit.

9. The battery protecting circuit described in claim 8, wherein said switching circuit has a first NMOS transistor inserted in said power feeding path such that the diode contained between the drain and the source becomes forward biased with respect to the charging current flowing from said external power source to said battery;

a second NMOS transistor inserted in said power feeding path such that the diode contained between the drain and the source becomes backward biased with respect to said charging current;

said switch driver boosts the voltage generated at the source of said first NMOS transistor and feeds it to the gate of said first NMOS transistor, and, at the same time, it boosts the voltage generated at the source of said second NMOS transistor and feeds it to the gate of said second NMOS transistor;

said driving voltage feeding circuit has a second PMOS transistor connected between the drain and gate of said second NMOS transistor;

and a transistor driver that drives said second PMOS transistor ON/OFF corresponding to the control signal of said controller.

10. The battery protecting circuit described in claim 9, wherein it has a diode connected in series to said second PMOS transistor such that the current flowing to said second PMOS transistor is stopped by said boosted voltage of said switch driver.

11. The battery protecting circuit described in claim 9 wherein
it has a first terminal for input of the voltage for selecting the charging mode of said battery;
a judgment circuit that judges whether a voltage is fed from said external power source through said power feeding path to said first terminal;
a power source circuit that generates the power source voltage of said controller based on the voltage fed from said external power source through said power feeding path;
a reset circuit that outputs a reset signal when the power source voltage generated in said power source circuit is lower than a prescribed voltage;
when a voltage is fed from said external power source through said power feeding path to said first terminal, said transistor driver drives ON said second PMOS transistor if said reset circuit outputs said reset signal or said controller outputs said control signal for turning ON said second PMOS transistor;
said controller performs the following operation:
when said reset signal is received and it starts, it outputs said control signal such that said first switch driver stops the boosting operation;
when said reset circuit stops output of said reset signal, if said judgment circuit judges that the voltage from said external power source is fed to said first terminal, it outputs said control signal such that said transistor driver turns ON said second PMOS transistor; and
when a signal is input indicating that the voltage of said battery has reached the voltage needed for the boosting operation of said switch driver, it outputs said control signal such that said switch driver starts the boosting operation, and said transistor driver turns OFF said second PMOS transistor.

12. Battery protecting circuit for driving first and second transistors of a battery device that has a secondary battery and first and second transistors connected in series between a power source terminal of the secondary battery and an external power source terminal comprising
the battery protecting circuit has
a first driver that feeds a first driving signal to the control terminal of said first transistor,
a second driver that feeds a second driving signal to the control terminal of said second transistor;
a mode selector that contains a mode selection terminal that applies a voltage corresponding to the voltage fed to the external power source terminal or a reference voltage, a fourth transistor that can be connected between a connection middle point between said first transistor and said second transistor and the control terminal of said second transistor, and a driver for feeding a fourth driving signal to the control terminal of said fourth transistor corresponding to the voltage applied on said mode selection terminal; and wherein
when current is fed from the external power source terminal to the secondary battery, if the voltage appearing at said mode selection terminal is a voltage corresponding to the voltage fed to said external power source terminal, said fourth transistor is turned ON.

13. The battery protecting circuit described in claim 12, comprising a voltage monitoring circuit that monitors the voltage fed to the external power source terminal;
a power source circuit that can feed power from the connection middle point between said first transistor and said second transistor; and wherein
said power source circuit starts the internal power source voltage after said voltage monitoring circuit detects a prescribed voltage.

14. The battery protecting circuit described in claim 12 wherein
said first and second transistors are first and second NMOS transistors having their drains connected to each other.

15. Battery protecting circuit for driving the first, second and third transistors of a battery device that has a secondary battery, a first and a second transistor connected in series between a power source terminal of the secondary battery and an external power source terminal and a third transistor connected between a connection middle point between said first transistor and said second transistor and the power source terminal of the secondary battery comprising
the battery protecting circuit has
a first driver that feeds a first driving signal to the control terminal of said first transistor;
a second driver that feeds a second driving signal to the control terminal of said second transistor;
a third driver that feeds a third driving signal to the control terminal of said third transistor;
a mode selector that contains a mode selection terminal that applies a voltage corresponding to the voltage fed to the external power source terminal or a reference voltage, a fourth transistor that can be connected between the connection middle point between said first transistor and said second transistor and the control terminal of said second transistor, and a driver for feeding a fourth driving signal to the control terminal of said fourth transistor corresponding to the voltage applied on said mode selection terminal,
a voltage monitoring circuit for monitoring the voltage fed to the external power source terminal;
a power source circuit, with power fed from the connection middle point between said first transistor and said second transistor, which starts feeding of an internal power source voltage after said voltage monitoring circuit detects a prescribed voltage;
when current is fed from the external power source terminal to the secondary battery;
if the voltage appearing at said mode selection terminal is a voltage corresponding to the reference voltage, said fourth transistor is turned OFF; and wherein
when an internal power source voltage is not fed from said power source circuit, said third driver responds to the voltage appearing at the connection middle point between said first transistor and said second transistor and feeds the third driving signal to turn ON said third transistor.

16. The battery protecting circuit described in claim 15, wherein
said battery device has a first resistance element connected between the power source terminal of the secondary battery and said third transistor.

17. The battery protecting circuit described in claim 15, wherein
said battery device has a second resistance element connected between a connection middle point between said first transistor and said second transistor and said third transistor.

18. The battery protecting circuit described in claim 15 wherein said first and second transistors are first and second NMOS transistors with their drains connected to each other; and said third transistor is a PMOS transistor having its source connected to the drains of said first and second NMOS transistors.

19. The battery protecting circuit described in claim 2 a power source circuit that generates the power source voltage of said controller based on the voltage fed to said external power source through said first power feeding path;

a reset circuit that outputs a reset signal when the power source voltage generated in said power source circuit is lower than a prescribed voltage;

Wherein said controller performs the following operation:

when said reset signal is received and it starts, it outputs said control signal such that said first switch driver stops the boosting operation, and said second switch driver generates said second driving voltage; and when a prescribed signal is input to indicate that the voltage of said battery has reached the voltage needed for performing the boosting operation of said first switch driver, it outputs said control signal such that said first switch driver starts the boosting operation, and said second switch driver stops generating said second driving voltage.

20. The battery protecting circuit described in claim 2 wherein said first switching circuit has a first NMOS transistor inserted in said first power feeding path such that the diode contained between the drain and the source becomes forward biased with respect to the charging current flowing from said external power source to said battery;

a second NMOS transistor inserted in said first power feeding path such that the diode contained between the drain and the source becomes backward biased with respect to said charging current;

said second switching circuit contains a first PMOS transistor inserted in said second power feeding path such that the diode contained between the drain and the source becomes backward biased with respect to said charging current;

said first switch driver boosts the voltage generated at the source of said first NMOS transistor and feeds it to the gate of said first NMOS transistor, and, at the same time, it boosts the voltage generated at the source of said second NMOS transistor and feeds it to the gate of said second NMOS transistor;

and said second switch driver feeds a voltage lower than the voltage generated at the source of said first PMOS transistor to the gate of said first PMOS transistor.

* * * * *